United States Patent [19]

van den Nieuwelaar et al.

[11] Patent Number: 5,173,077
[45] Date of Patent: Dec. 22, 1992

[54] METHOD AND DEVICE FOR PERFORMING AN ACCURATE CUTTING OPERATION NEAR THE KNEE JOINT OF A LEG OF A SLAUGHTERED ANIMAL

[75] Inventors: Adrianus J. van den Nieuwelaar, Gemert; Jan W. Bos, Ede; Hein Annema, Stevensbeek, all of Netherlands

[73] Assignee: Stork PMT B.V., Boxmeer, Netherlands

[21] Appl. No.: 647,580

[22] Filed: Jan. 29, 1991

[30] Foreign Application Priority Data

Jan. 30, 1990 [NL] Netherlands ............... 9000228
Nov. 12, 1990 [NL] Netherlands ............... 9002470

[51] Int. Cl.⁵ ................................. A22C 21/00
[52] U.S. Cl. ........................ 452/163; 452/167; 452/155; 452/135
[58] Field of Search ........... 452/163, 155, 156, 179, 452/180, 136, 167, 135, 136

[56] References Cited

U.S. PATENT DOCUMENTS

| | | |
|---|---|---|
| 2,846,718 | 8/1958 | Sengelaub et al. . |
| 3,038,197 | 6/1962 | Turner . |
| 3,199,143 | 8/1965 | Ousley et al. . |
| 3,261,054 | 7/1966 | Kaplan et al. ............... 17/11 |
| 3,323,164 | 6/1967 | Bonuchi et al. . |
| 3,364,515 | 1/1968 | Brown et al. ............ 452/167 |
| 3,643,293 | 2/1972 | Rejsa et al. . |
| 3,672,000 | 6/1972 | Martin et al. . |
| 4,041,572 | 8/1977 | Martin et al. ............... 17/46 |
| 4,327,463 | 5/1982 | Martin ...................... 17/11 |
| 4,480,353 | 11/1984 | Martin et al. . |
| 4,495,675 | 1/1985 | Hill ........................... 17/1 G |
| 4,635,317 | 1/1987 | van der Eerden ........... 452/167 |
| 4,660,256 | 4/1987 | Innes et al. . |
| 4,669,150 | 6/1987 | Manmoto et al. .......... 452/136 |
| 4,811,456 | 3/1989 | Heuvel ..................... 452/136 |
| 4,893,378 | 1/1990 | Hazenbroek et al. . |
| 4,896,399 | 1/1990 | Hazenbroek . |
| 4,964,194 | 10/1990 | Kessler et al. ............. 452/167 |

FOREIGN PATENT DOCUMENTS

| | | |
|---|---|---|
| 0159077 | 10/1985 | European Pat. Off. . |
| 321718 | 6/1989 | European Pat. Off. . |
| 6713788 | 4/1968 | Netherlands . |
| 7317152 | 3/1974 | Netherlands . |
| 1181462 | 2/1970 | United Kingdom . |

*Primary Examiner*—Willis Little
*Attorney, Agent, or Firm*—Hurt, Richardson, Garner, Todd & Cadenhead

[57] ABSTRACT

A method and device for performing an accurate cutting operation near the knee joint of a leg of a slaughtered animal, in particular a bird, the device comprising mechanical means, such as conveying elements and guides, for handling the leg, and cutting means, such as rotary or stationary knives for performing the cutting operation, e.g. for making an incision prior to scraping off meat of a bone or for cutting through the leg. With the device, the desired cutting accuracy is obtained by using mechanical positioning means which operate on the kneecap of the leg, which is preferably bended in the knee joint in its natural bending direction by bending means. The positioning means may comprise one or more supporting elements with a stop edge, which can be moved along the thigh of the leg to against the kneecap.

30 Claims, 21 Drawing Sheets

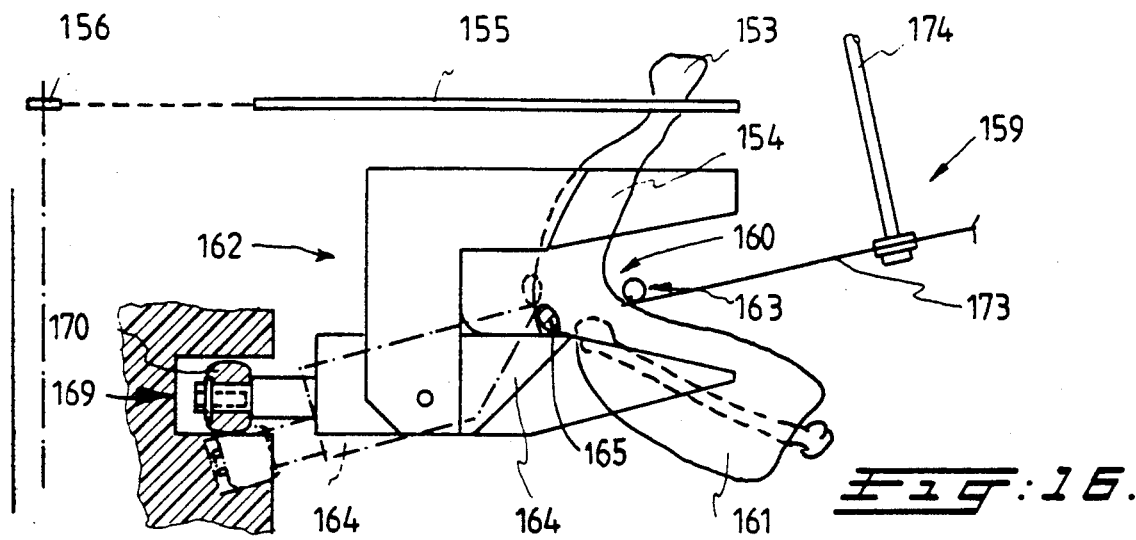
Fig. 16.
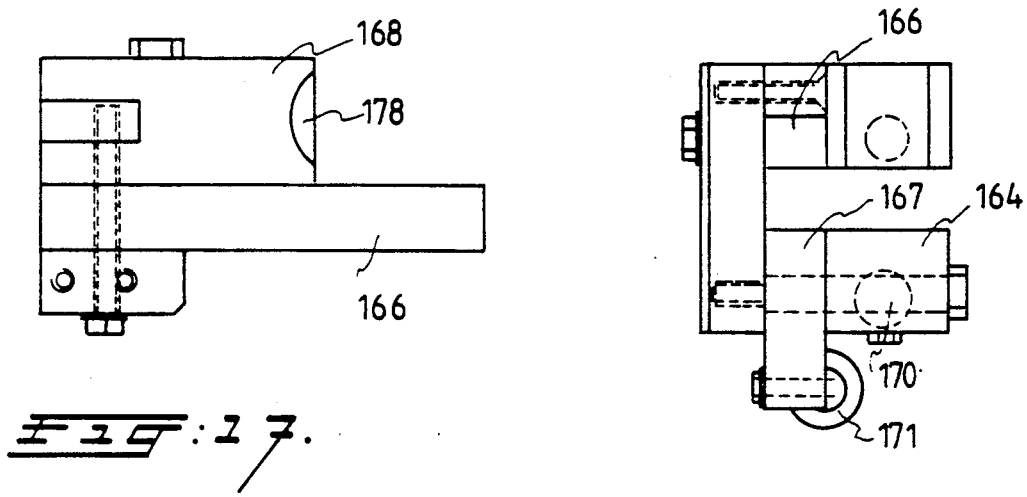
Fig. 17.
Fig. 19.
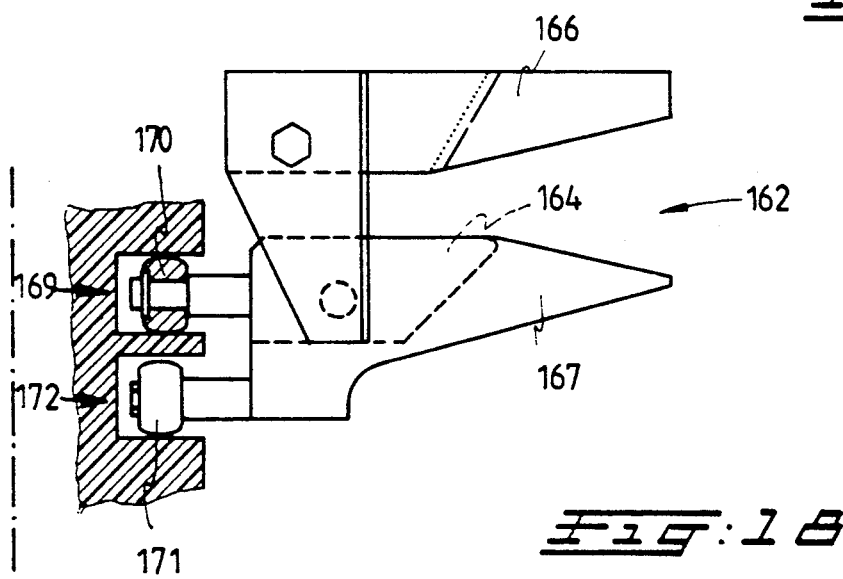
Fig. 18.

METHOD AND DEVICE FOR PERFORMING AN ACCURATE CUTTING OPERATION NEAR THE KNEE JOINT OF A LEG OF A SLAUGHTERED ANIMAL

BACKGROUND OF THE INVENTION

This invention relates to a method and a device for performing a cutting operation near the knee joint of a leg of a slaughtered animal, in particular a bird.

DISCUSSION OF THE PRIOR ART

In the mechanical processing of slaughtered animals, in particular of poultry, devices for performing a cutting operation are used e.g. for separating the legs severed from the slaughtered animal into a lower leg and a thigh. The lower leg, which in relation to birds is known as the drumstick, has a certain value as a snack, while the thigh still has a large quantity of meat which makes this part suitable for further processing. In the mechanical processing of animals, differences in the dimensions of legs, in particular the lower leg, i.e. the leg part between the knee joint and the ankle joint, inevitably occur due to differences in breed, age, breeding conditions and the like for different animals. This means that the above-mentioned separation with the conventional devices comprising fixed cutting means past which the leg hanging by the ankle joint is conveyed in a fixed path, cannot reach an optimum for every leg to be processed, because of the resulting poor positioning accuracy of the cutting means relative to the knee joint where the cutting takes place.

When the leg has been separated into a lower leg and a thigh, usually the thigh meat is removed from the thigh-bone. A device for scraping off the thigh meat is described in U.S. patent specification No. 3,672,000 and comprises a two-part plate-shaped clamping mechanism in which a knuckle of the thigh-bone of a bird can be clamped in such a way that the meat-covered thigh-bone extends vertically below it. Directly below the clamping mechanism is a two-part plate-shaped scraper which can be moved in the vertical direction, and with which the meat can be separated from the bone in the downward direction.

The meat-covered thigh pieces which are fed by hand to the device can be coming from, for example, a mechanized slaughter line where the bird carcasses hanging by the tarsal joints from a conveyor are being jointed mechanically. One of the operations in such a jointing line is the separation of the body and the legs, following which the legs continue their way on the conveyor. For the purpose of obtaining the thigh meat, the thighs are then, as described before, cut away mechanically from the drumstick, collected, conveyed and fed manually one by one to a device of the above-mentioned type for scraping off the thigh meat. The necessary human intervention makes this method labour-intensive, while there are objections to the method from the hygiene point of view.

SUMMARY OF THE INVENTION

The object of the invention is to provide a method and a device providing an accurate positioning for the above-mentioned cutting operation in general, not specifically limited to application in a drumstick cutting device but also in other leg processing devices for other animals than birds, e.g. a thigh meat scraper.

This object is attained by the method according to the invention, wherein the leg is brought into position by mechanical means relative to cutting means for performing the cutting operation, and wherein prior to the cutting operation mechanical positioning means operate on the kneecap for positioning the knee joint relative to the cutting means.

Accordingly, the device according to the invention, comprising mechanical means for handling the leg and cutting means for performing the cutting operation, further comprises mechanical positioning means which operate on the kneecap for positioning the knee joint relative to the cutting means.

Through these measures it becomes possible to reproducibly carry out a cutting operation on a leg at a predetermined position relative to the knee joint, i.e. irrespective of the measurements of the lower leg or the thigh.

In a preferred embodiment of the device according to the invention, bending means for bending the leg in the knee joint in its natural bending direction are provided. As a result of the bending of the leg, the kneecap projects slightly more from the knee joint, which makes finding of the kneecap easier in order to position the knee joint.

Preferably, the bending means are designed for bending the leg in such a way that the part of the leg situated at one side of the knee joint is approximately at right angles to the part of the leg situated at the other side of the knee joint.

The intended accuracy of the positioning of the knee joint according to the invention can be achieved by the characterizing use of positioning means comprising one or more supporting elements with a stop edge which can assume different positions relative to the mechanical means for handling the leg, in order to be able to move the stop edge along the thigh of the leg to against the kneecap.

A preferred embodiment of the device according to the invention is used for removing the meat from a thigh-bone of a slaughtered animal, in particular a bird, and comprises in a manner which is known per se scraper means for scraping the thigh meat off the thigh bone from the knee joint to the hip joint. This embodiment advantageously comprises a suspension element for suspending a leg to be processed by the ankle joint.

With this device the thigh meat is scraped off a thighbone, which thigh-bone is connected by means of the substantially intact knee joint to the lower leg, which is held at the ankle joint for the purpose of the scraping operation from the knee joint to the hip joint. The ligaments of the knee joint absorb the scraping forces here. The scraping forces are kept as low as possible by, prior to the scraping operation, making an accurate incision in the meat near the knee joint essentially at right angles to the lengthwise direction of the leg, while it must be ensured that the knee ligaments are not damaged during the incision.

To remove the meat from a thigh-bone, which can now be done automatically and accurately in a conveyor line, human intervention is no longer necessary. This is of great benefit in regard to the hygiene of the meat processing, while also reducing the cost of processing.

Another preferred embodiment of the device according to the invention, designed for cutting through the knee joint of a leg of a slaughtered animal, in particular a bird, comprises in a known manner a frame with a conveyor for bringing in the legs hanging by the ankle joint. The following characterizing measures are used in this device:

at least one rotary element is disposed next to the conveyor for taking over the legs one by one from the conveyor and retaining them, and returning the lower legs thereof, which rotary element is provided with a number of carriers which during operation move in a circular path virtually tangentially along the centre line of the conveyor, in a direction opposite to the forward movement of the conveyor, past a cutting element interacting with each rotary element;

a V-shaped supporting element, which projects radially outwards and moves along with the rotary element, is present below each carrier;

a push rod is disposed along a part of the circular path of the supporting elements away from the conveyor, for gradually exerting pressure in the radially inward direction against the back of the knee of a leg present in a carrier;

a displaceable lifter is fitted at each of the V-shaped supporting elements for positioning, in the direction of the ankle joint, the kneecap of a leg joint pressed by the push rod against the supporting element in question.

On completion of the cutting operation, the thigh falls down and in the process can be collected and removed. It is, of course, possible to carry out the cutting through of the knee joint in several phases, in which first of all only an incision is made, and a final severing is then carried out, which cutting operation can, if necessary, be performed with different cutting means. The drumstick itself remains hanging in the advancing carrier and can also be delivered to a suitable place.

Yet another preferred embodiment of the device according to the invention, designed for cutting through the knee joint of a leg of a slaughtered animal, in particular a bird, comprises in a known manner a frame with a conveyor for bringing in the legs hanging by the ankle joint. The following characterizing components are used in this device:

guide means with a guide edge running mainly parallel with the conveyance direction of the conveyor for pushing the leg out sideways;

positioning means which are situated beside the legs suspended from the conveyor and, in operation, cooperate with the guide means to position the kneecap of a knee joint against a supporting element; and separating means cooperating with the guide means and the positioning means for separating the lower leg from the thigh.

It will be evident from the foregoing that with the accurate positioning of the knee joint by the method and device according to the invention, involving positioning of the kneecap relative to cutting means, it is also possible to perform the operation of removing the kneecap from the leg, e.g. by machining away the kneecap. Another operation which can be performed according to the invention is cutting just through the skin near the knee joint for removing part of the skin of the leg.

Other claims and advantages will be more readily appreciated as the same becomes better understood by reference to the following detailed description and considered in connection with the accompanying drawings of several embodiments of a device according to the invention, in which like reference symbols designate like parts.

DESCRIPTION OF THE DRAWINGS

FIG. 1a shows a schematically illustrated side view of a scraping device for thighs of bird legs with different scraper units;

FIG. 1b shows a top view of the device of FIG. 1a;

FIG. 16 shows a phase of cutting off a drumstick;

FIGS. 17–19 are three views of the V-shaped supporting element shown in FIG. 16;

DESCRIPTION OF THE PREFERRED EMBODIMENTS

Figure 2B:
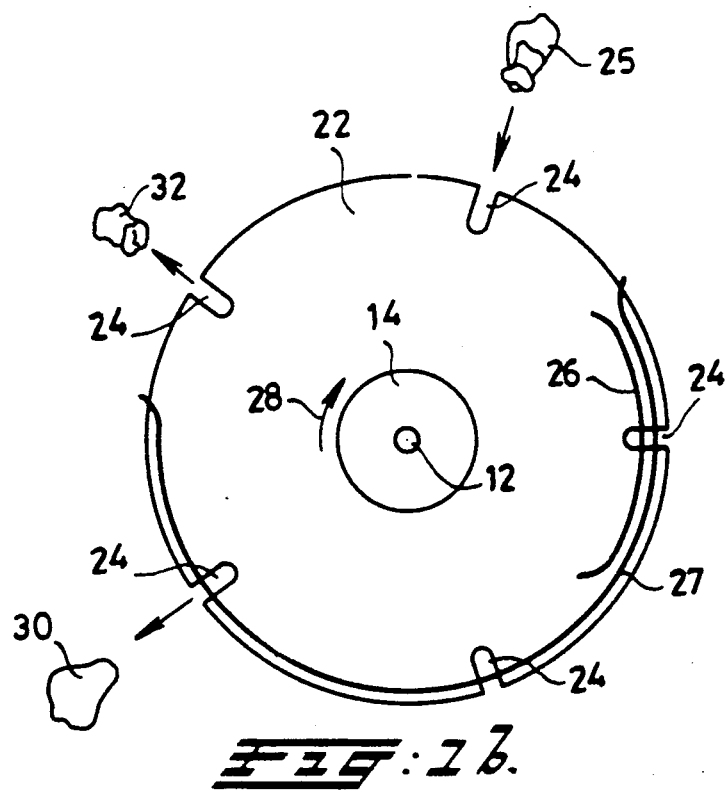
FIG. 2 shows a side view, partially in cross-section, of a scraper unit interacting with a control element, in the case of which only the essential parts are shown.
Figure 2A:
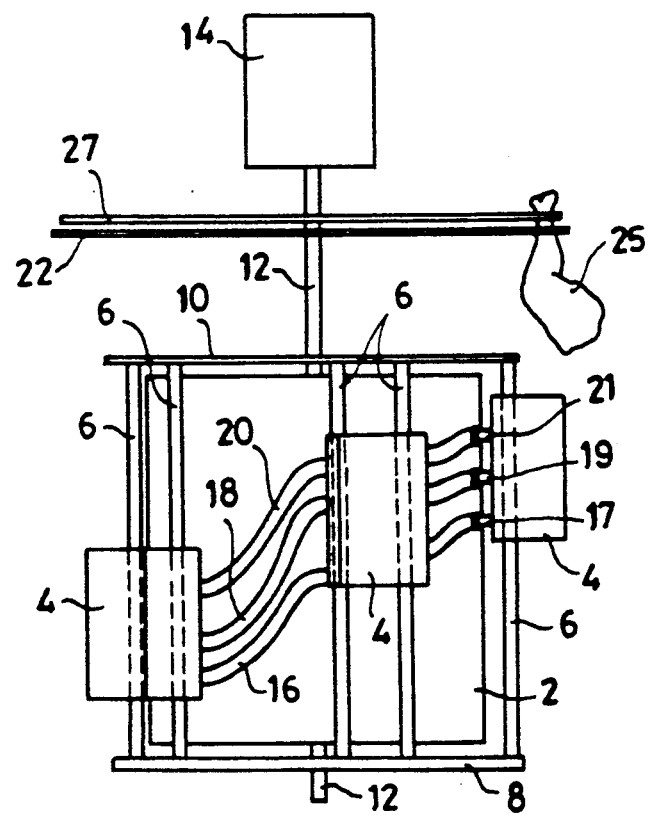

FIGS. 1a and 1b show a fixed cylindrical control element 2, along the cylindrical surface of which five scraper units 4 can move, through the fact that, on the one hand, the scraper units 4 are slidable in a vertical direction along guide rods 6 and, on the other, the guide rods 6 are connected to disc-shaped bearing plates 8 and 10, which can be rotated in a certain direction by means of a shaft 12 with the aid of a drive 14. The scraper units 4, which in this case are shown symbolically as rectangular blocks, are described in detail below with reference to FIGS. 2-10.

The control element 2 is provided on its cylindrical surface with guide grooves 16, 18 and 20 for moving each scraper unit 4 with the aid of guide means 17 along the guide rods 6 according to the course of the groove 16 on rotation of the bearing plates 8 and 10, and for controlling, with the aid of guide means 19 and 21, movements of parts of each scraper unit on rotation of the bearing plates 8 and 10.

Fitted above the top bearing plate 10 is a suspension disc 22 which rotates in synchronism with the bearing plates 8 and 10 and above each scraper unit 4 is provided with a slit-shaped recess 24, in which a leg 25 of a bird can hang by the tarsal joint. The width of the recess 24 is ample for the accommodation of the bone of the lower leg of the bird, but is narrower than the cross-section of the tarsal joint, as a result of which the leg is prevented from moving in the downward direction and in the tangential direction. In order to prevent the leg from being able to come out of the recess 24 accidentally after being suspended therein, the leg part near the tarsal joint is fed, on rotation of the suspension disc 22, between two guide rails 26 and 27 running above the disc in the tangential direction, which rails lie at a distance from each other which is approximately equal to the width of the recess 24. Rail 26 extends over a smaller angle than rail 27, which will be explained in the discussion of FIGS. 5–11.

The component parts of the scraper unit described above interact during the rotation of the shaft 12 in the direction of arrow 28 and the plates 8 and 10 coupled thereto in such a way that, after the hanging of a leg 25 in a recess 24 of the suspension disc 22, symbolically shown at the top side of FIG. 1b, the thigh meat is scraped off the thigh bone of the leg 25 in a manner and with a device which will be described in greater detail below, following which the thigh meat 30 leaves the device at a particular point on the periphery, followed by the leg 32 from which the thigh meat 30 has been scraped off. In the case of this operation it is possible for the scraped-off thigh meat to remain adhering to the hip joint part of the thigh-bone, as a result of which use must be made of cutting means (not shown in further detail) for bringing about a separation between the leg 32 and the thigh meat 30.

Figure 2:
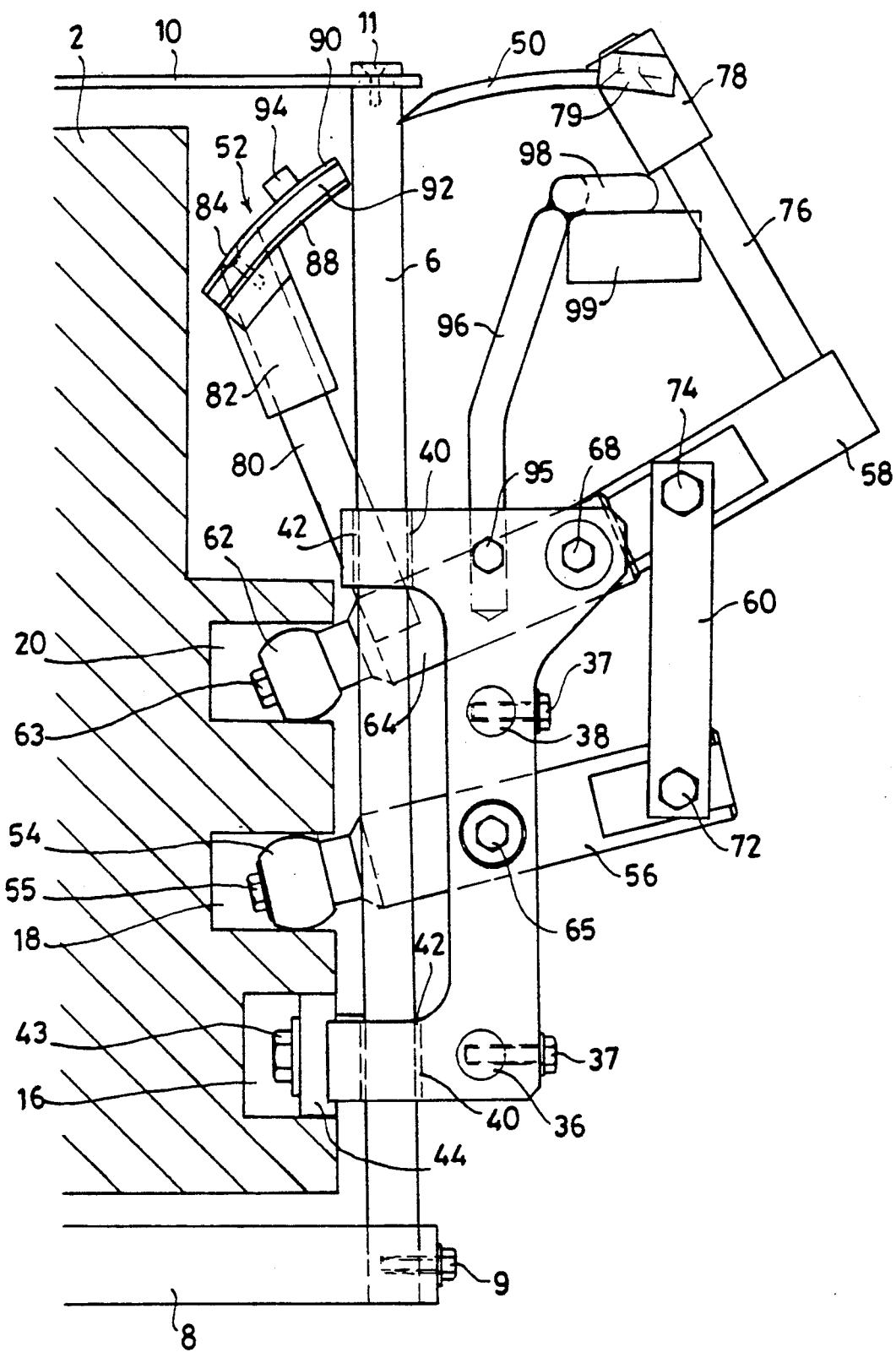
Figure 3:
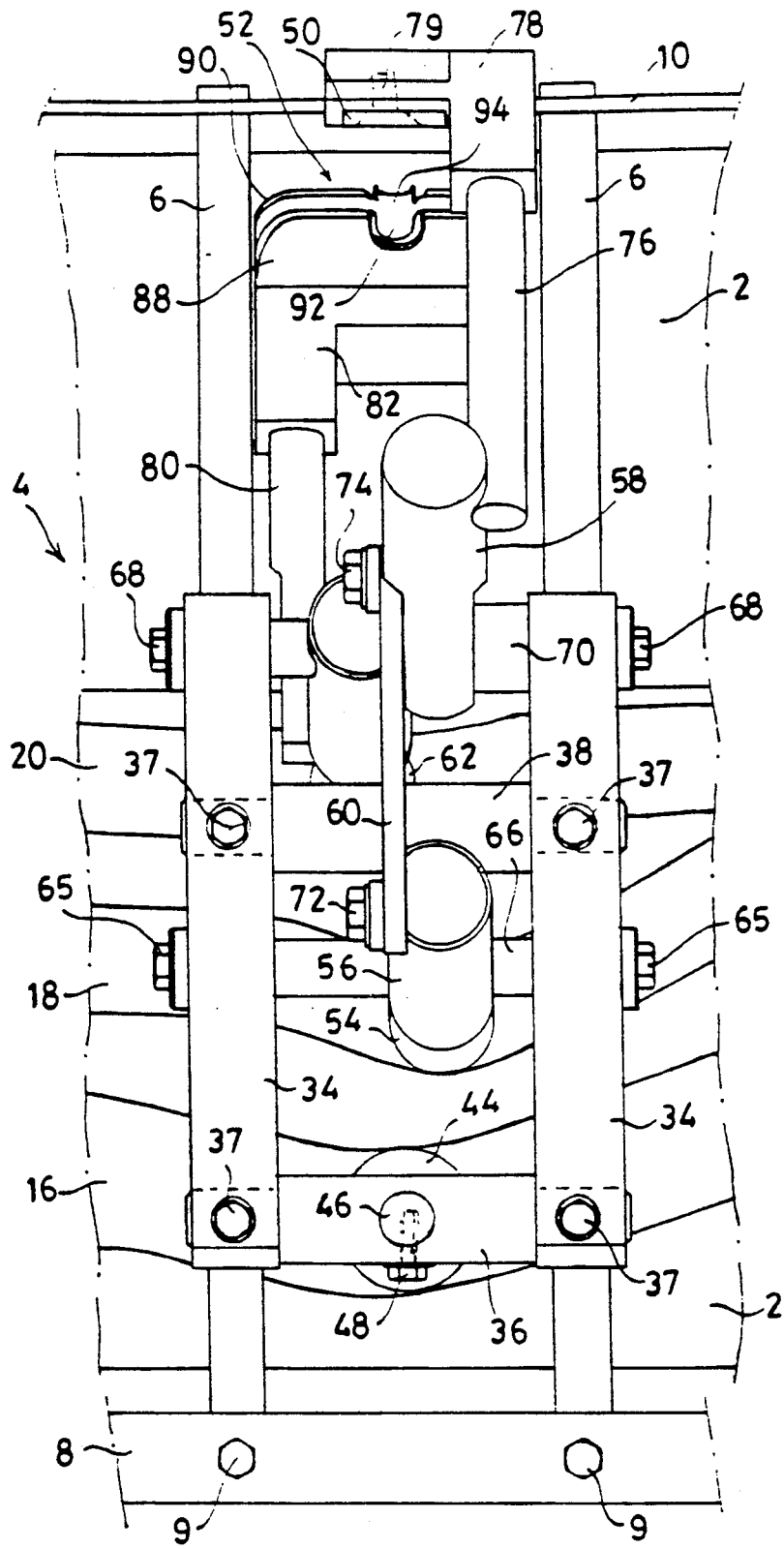
FIG. 3 shows a front view of the scraper unit of FIG. 2, leaving out a bridge with push rod and aligning plate.
Figure 4:
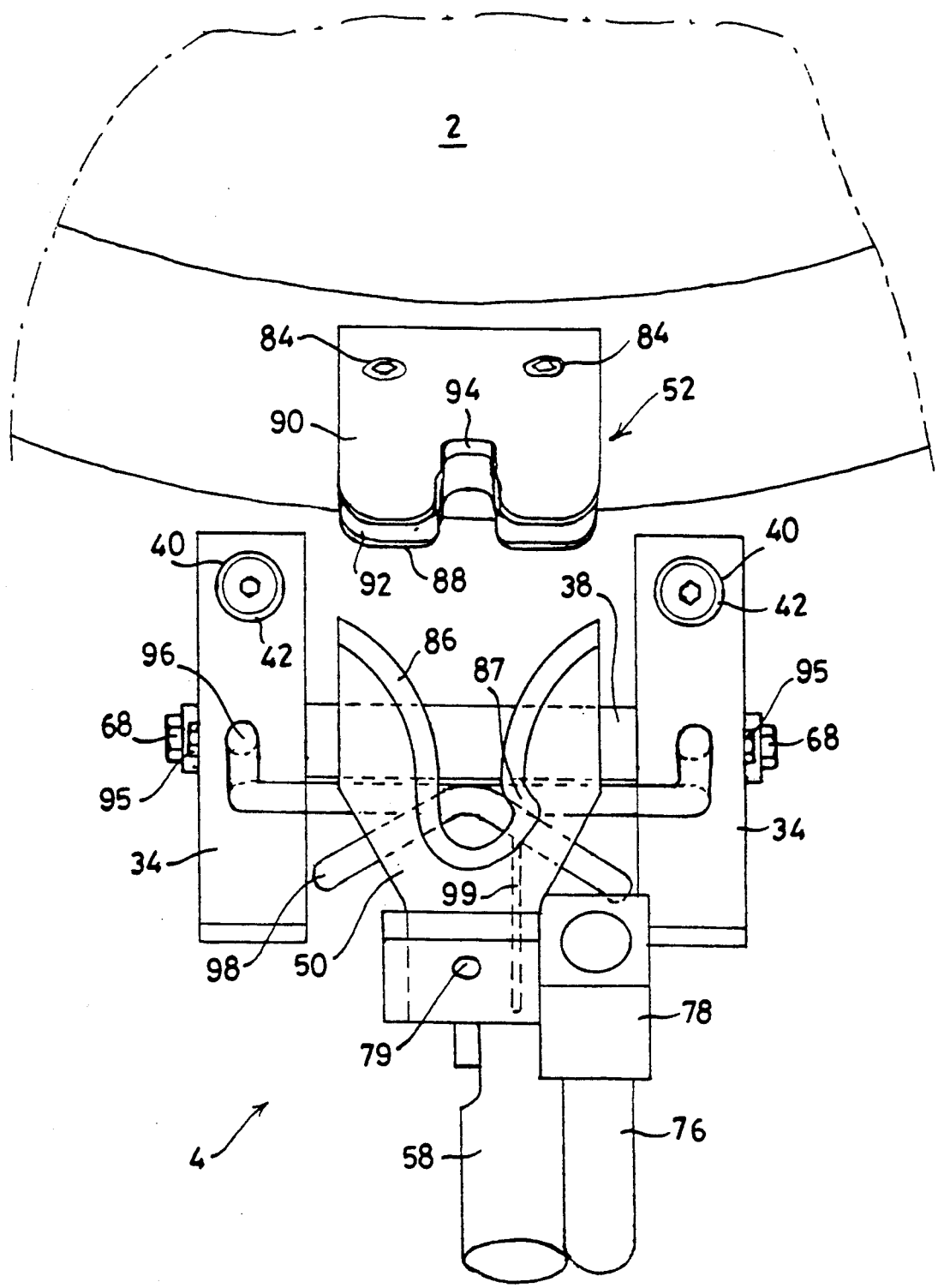
FIG. 4 shows a top view of the scraper unit of FIG. 2, in which, for the sake of clarity, various components are not shown.

FIGS. 2, 3 and 4 show an embodiment of the scraper unit 4, the basic construction of which is formed by two essentially U-shaped carriers 34 which are connected to each other by connecting rods 36 and 38. The connection is secured by means of bolts 37.

Through holes 40 with bearing bushes 42 are fitted in the two limbs of the two carriers 34, by means of which the carriers 34 can slide in a vertical direction over the rods 6, which are fixed by means of bolts 9 and 11 to bearing plates 8 and 10 respectively. This sliding movement is controlled by the groove 16 in the control element 2, in which groove 16 can run a wheel 44 which is mounted rotatably about a bolt 43 on a pin 46 fixed to connecting rod 36. The connection is secured by means of bolt 48.

The scraper unit 4 further comprises a first scraper element 50 and a second scraper element 52, the movement of which is controlled by grooves 18 and 20 respectively in their relation to groove 16 in the control element 2, and is transmitted to the scraper elements 50 and 52 by means of wheel 54, levers 56 and 58 and coupling strip 60, and wheel 62 and lever 64 respectively.

The wheel 54 is to this end fixed by means of bolt 55 to lever 56, which can pivot about a shaft 66 fitted in the carriers 34 by means of bolts 65. Lever 56 is connected at its end facing away from the wheel 54 by means of coupling strip 60 to the central part of lever 58, which can pivot about a shaft 70 fitted in the carriers 34 with the aid of bolts 68. The coupling strip 60 can pivot about two bolts 72 and 74 and transmits a movement of the lever 56 to the lever 58.

Fitted at the end of lever 58 facing away from the shaft 70 is a transverse bar 76 which at its end bears in a holder 78 the first scraper element 50 with the aid of a bolt 79.

The wheel 62 is fixed rotatably about bolt 63 on lever 64, which can pivot about the shaft 70.

Fitted at the end of lever 64 facing away from the shaft 70 is a transverse bar 80 which bears at its end a fixing plug 82, on which the second scraper element 52 is fixed by means of two bolts 84.

The first scraper element 50 is plate-shaped and bent along the arc of a circle with the centre point in the centre line of the shaft 70, and is provided with a recess which is open at one side and has an edge boundary 86, intended for scraping. The part of the edge boundary 86 which lies at the foot of the recess near bolt 79 is sharply ground and intended for cutting.

Like the first scraper element, the second scraper element 52 is plate-shaped and curved in the arc of a circle with the centre point on the centre line of the shaft 70, which arc has a smaller radius than the arc belonging to the first scraper element 50. The second scraper element 52 has a laminated structure and comprises two rigid plates 88 and 90, between which a plate 92 of flexible material is mounted. All three plates 88, 90 and 92 are provided with a recess which is open at the side facing the first scraper element 50. The width of the recess in the rigid plates 88 and 90 is in this case slightly greater than the width of the recess in the flexible plate 92, which means that only the flexible material comes into contact with the bone of the thigh to be scraped. The flexible plate 92 also has a stop 94 which borders on the end of the recess in the second scraper element 52.

The two scraper elements 50 and 52 can, under the control of the grooves 18 and 20 in the control element 2, move away from and towards each other, in which latter movement the first scraper element 50 can slide over the second scraper element 52, as a result of which the above-mentioned recesses determine a scraper opening with at least approximately the cross-section of a thigh-bone if the scraper elements 50 and 52 are slid partially over each other.

An essentially partially circular recessed part 87 is fitted in the edge boundary 86 of the first scraper element 50, as a result of which the scraper opening is enlarged at that side to allow a cartilage nodule on the hip joint to pass during the scraping. This cartilage nodule is found on the left side of the right leg of a bird and the right side of the left leg, and the first scraper element 50, which in the case shown is intended for processing right legs, therefore always has to be adapted to the case in question.

Finally, a stop is fixed by means of bolts 95 in blind holes in the carriers 34, which stop comprises a bridge 96, a V-shaped push rod 98 fixed thereto, and an aligning plate 99.

In FIG. 3 the stop is not shown, for the sake of clarity, while for the same reason different parts of the scraper unit 4 are not shown in FIG. 4.

The operation of the scraper unit 4 is explained below with reference to the schematic illustrations in FIGS. 5–11.

Figure 5:
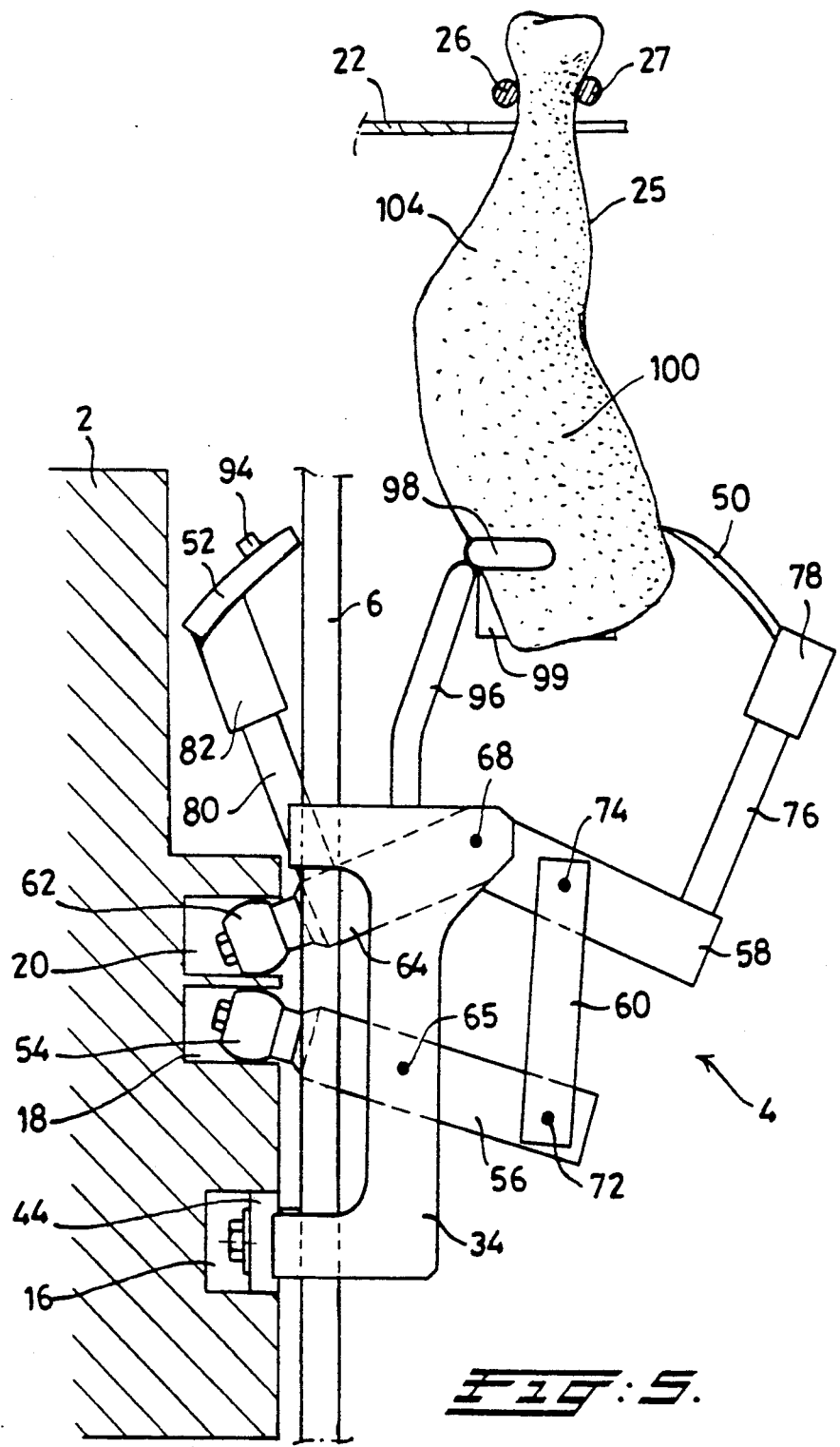
FIGS. 5–11 show the side view of FIG. 2 in simplified form on a smaller scale during successive stages of a scraping operation with the device according to the invention.

FIG. 5 shows the scraper unit 4 in a low initial position, in which the first scraper element 50 and the second scraper element 52 are far apart in order to admit a bird leg 25 hanging from guide rails 26 and 27 between said elements 50 and 52. The leg 25 finally hangs with its front side against push rod 98, while turning of the leg relative to the suspension between guide rails 26 and 27 is prevented by means of aligning plate 99.

Figure 6:
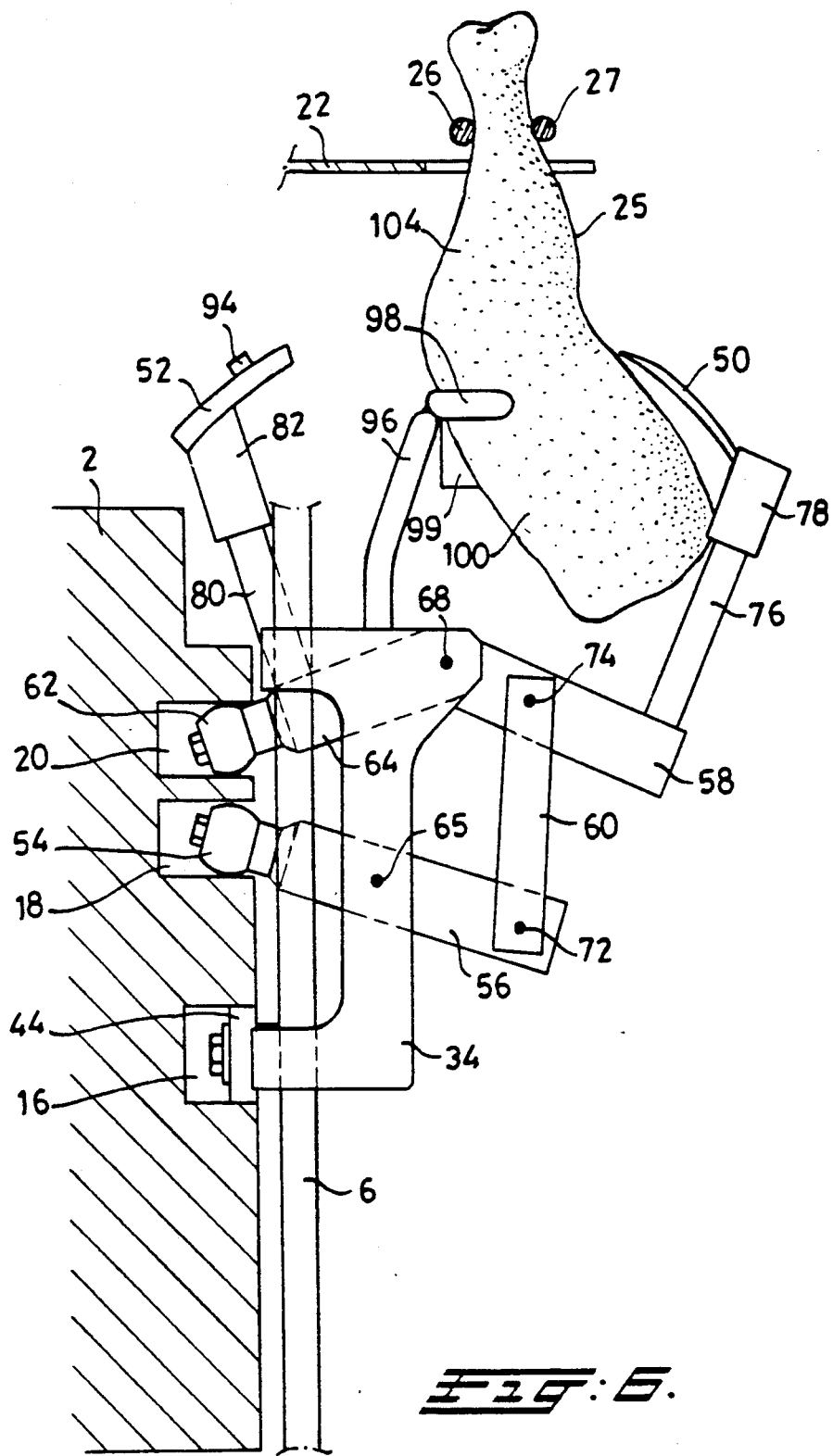

In FIG. 6 the scraper unit 4 is pushed up relative to the position shown in FIG. 5 through displacement of the unit along the control element 2, so that the push rod 98 slides along the front side of the thigh meat 100 in the direction of the knee joint and the leg tilts slightly between the guide rails 26 and 27 in the direction of the first scraper element 50.

Figure 7:
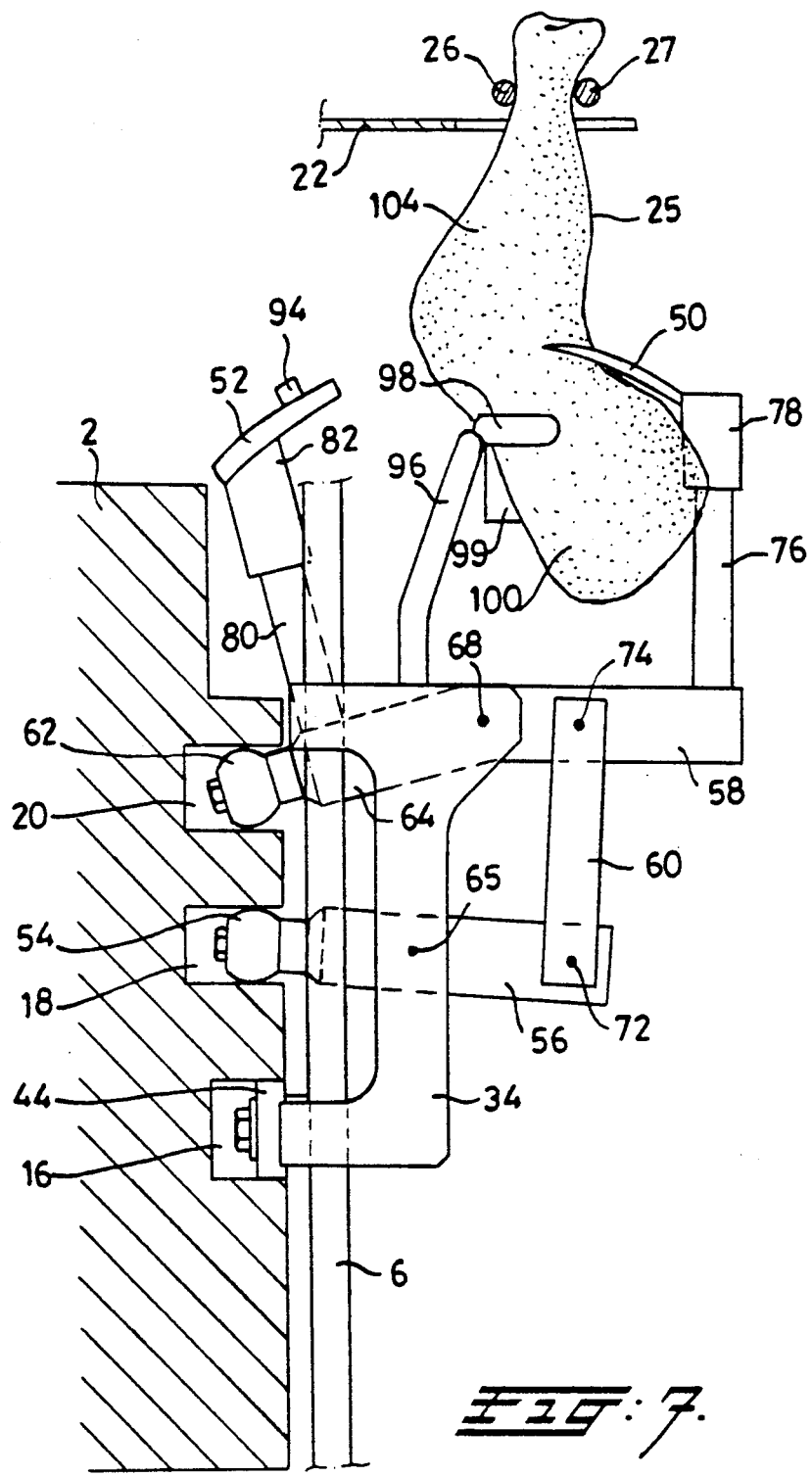
Figure 8:
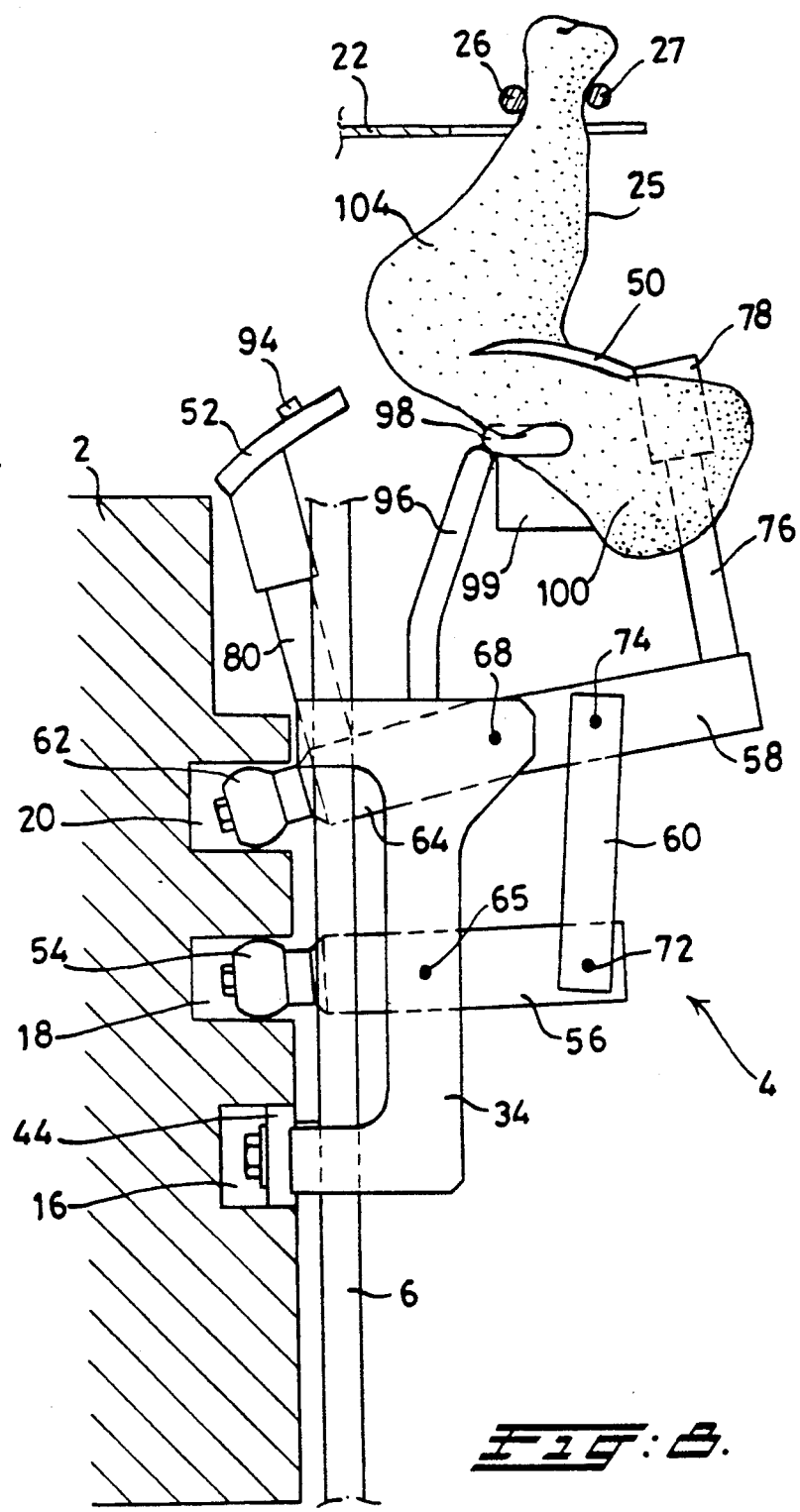

FIGS. 7 and 8 show that, starting from the position shown in FIG. 6, the first scraper element 50 moves over the skin surface of the rear side of the thigh meat 100 in the direction of the knee joint of the leg. The leg 25 in the process comes to rest in the recess of the first scraper element 50, the wedge-shaped edge boundary 86 of the recess pushing the meat ahead of it at either side of the knee joint and thus, interacting with the push rod 98, bending the leg 25.

Figure 9:
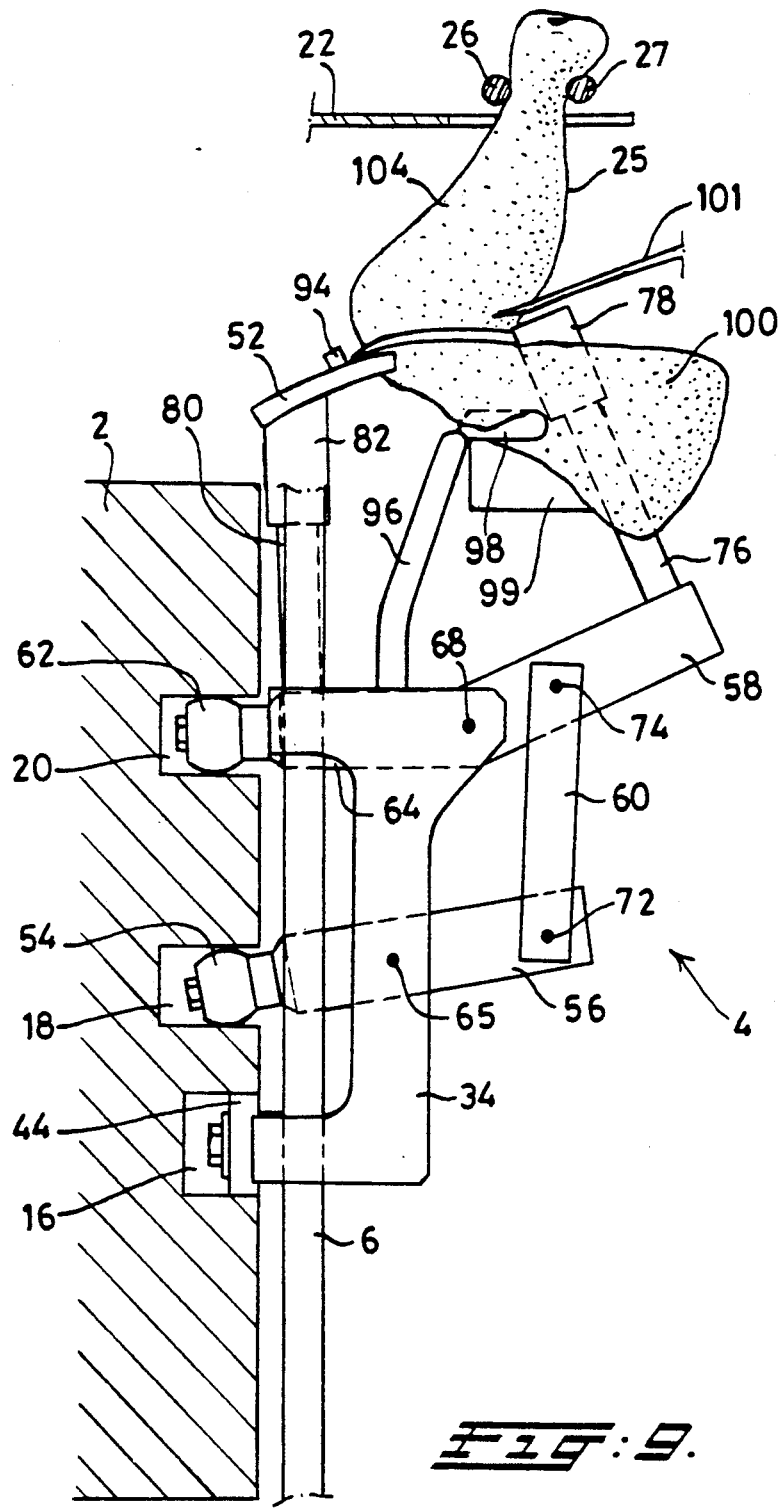
Figure 10:
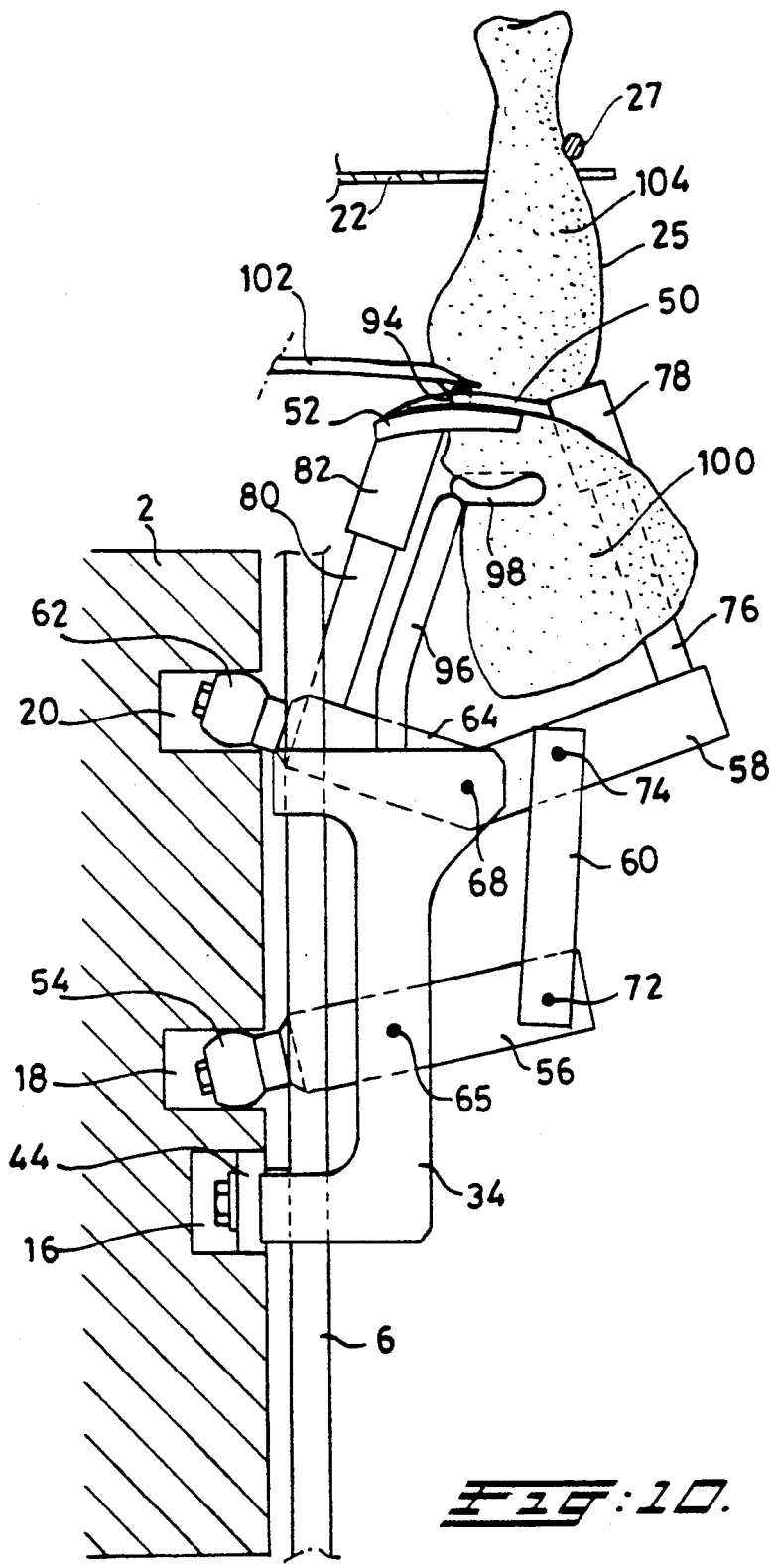

FIG. 9 shows that the first scraper element 50 has been moved until it is above the push rod 98, in which case the sharply ground part of the recess of the first scraper element 50 has cut into the meat at either side of the knee joint, and the second scraper element 52 is brought into contact with the leg 25 which has been bent at approximately a right angle. A knife 101, which is disposed in a fixed manner relative to the control element 2, at this stage makes an incision at the rear side of the leg 25 in the back of the knee, which place in this phase of the processing is well-defined through the preceding movement of the first scraper element 50 and is reproducible, irrespective of the variable length within certain limits of a drumstick 104 of a leg.

The second scraper element 52 then slides further below the first scraper element 50, in which case a scraper opening with a cross-section the size of the thigh-bone is produced. The scraper elements 50 and 52 thereafter move jointly to a predetermined position, shown in FIG. 10, in which the knee joint is stretched and the kneecap rests on the stop 94 of the second scraper element 52. During this movement the stop 94 presses the leg below the kneecap upwards relative to the guide rail 27. There is enough space for this because at that place guide rail 26 no longer runs above suspension disc 22. In this predetermined position of the scraper elements 50 and 52, on further rotation of the scraper unit 4 relative to the control element 2, an incision is made directly above the stop 94 and below the kneecap by a knife 102 fixed relative to the control element 2. Thanks to the fact that the kneecap of the leg 25 is positioned relative to the knife 102 in the manner described above by means of the stop 94, the incision is always made in the same place at the knee joint, irrespective of the variable length within certain limits of a drumstick 104 of a leg. The stop 94 in this case prevents the kneecap from being cut through the centre by knife 102, which is undesirable.

Figure 11:
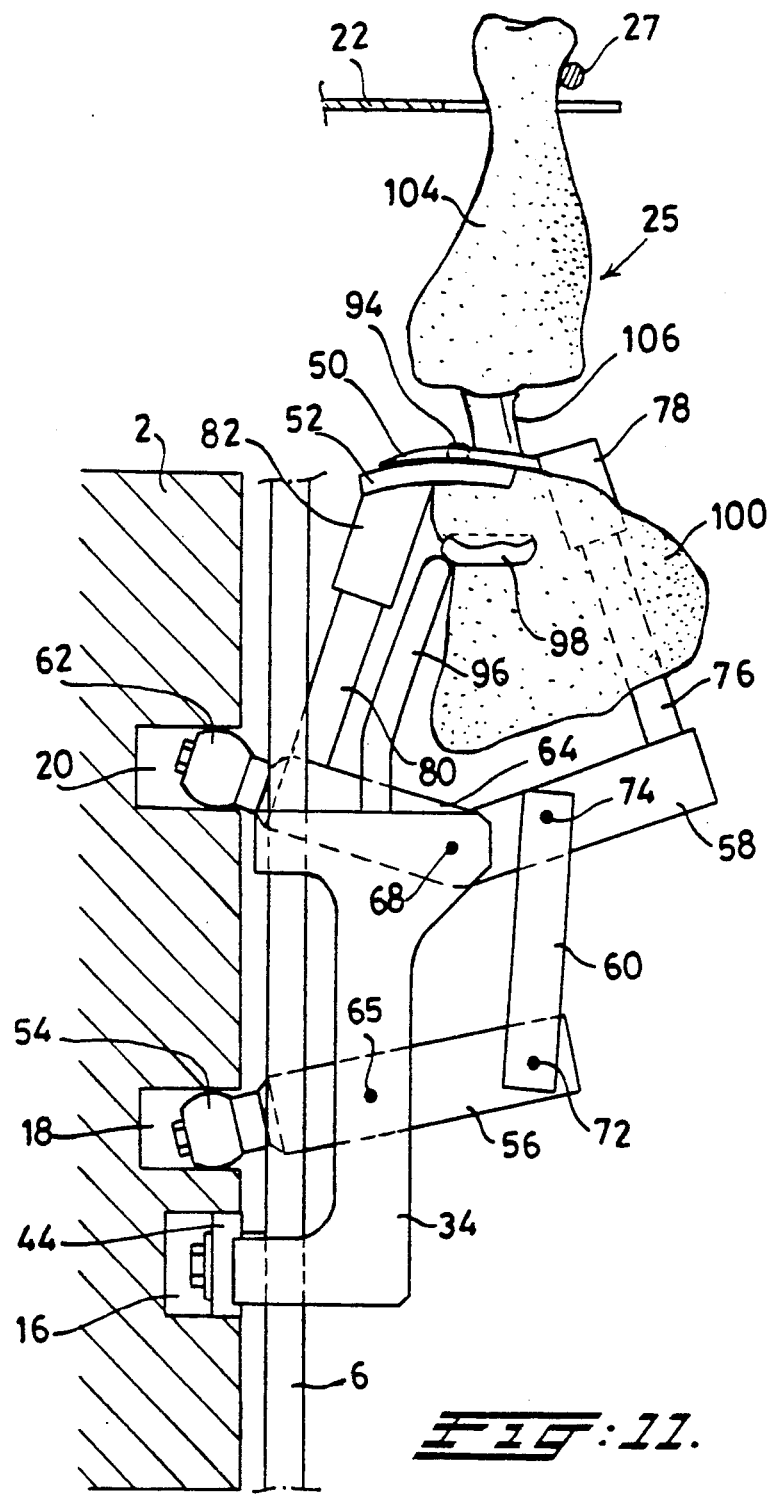

Finally, FIG. 11 shows the scraping off of the thigh meat 100 from the thigh-bone 106, by moving the scraper unit 4 from the position shown in FIG. 9 downwards, while maintaining the position of the scraper elements 50 and 52 slid over one another.

On passing the hip joint part of the leg the recessed part 87 of the first scraper element 50 ensures that the cartilage nodule on the hip joint is not mechanically stressed by the element 50, so that it cannot break off during the scraping.

Figure 12:
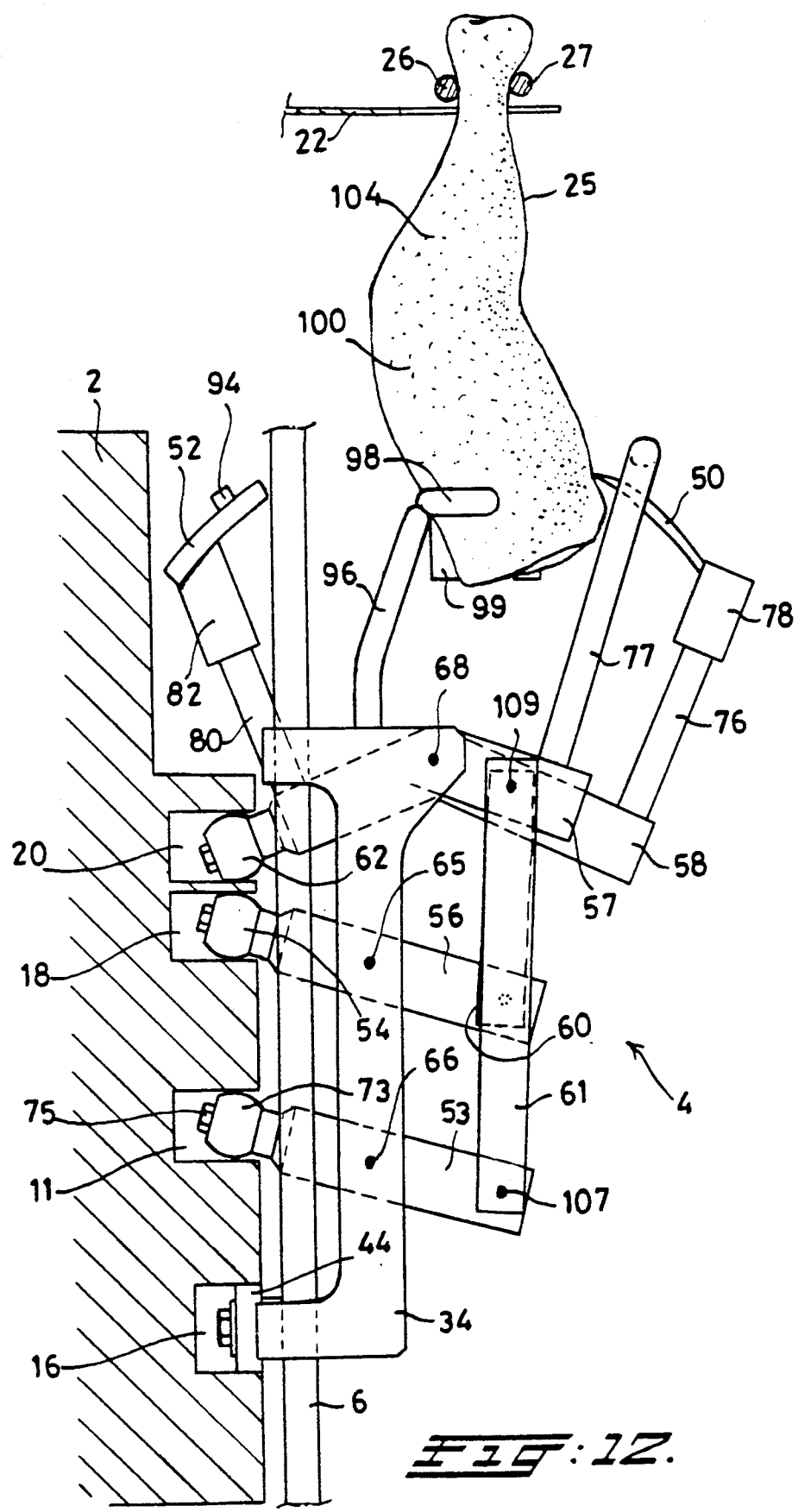
FIG. 12 shows an alternative embodiment of the scraper unit according to FIG. 2.

FIG. 12 shows, by way of example, a different embodiment of the scraper unit 4. Compared with what was shown in the earlier figures, an L-shaped bracket is added to said scraper unit and is rigidly fixed to a rod 57 which can pivot about shaft 68. The movement of the bracket 77, which is intended in conjunction with push rod 98 to bend the leg by pivoting anticlockwise about the shaft 68 according to the view of the drawing, takes place under the control of lever 53 which can pivot about shaft 66 if the roller 73 rotatably connected by means of bolt 75 to lever 53 moves upwards or downwards in groove 11 of control element 2. Lever 53 is connected to rod 57 by means of rod 61 so that it is pivotable about shafts 107 and 109.

Figure 13:
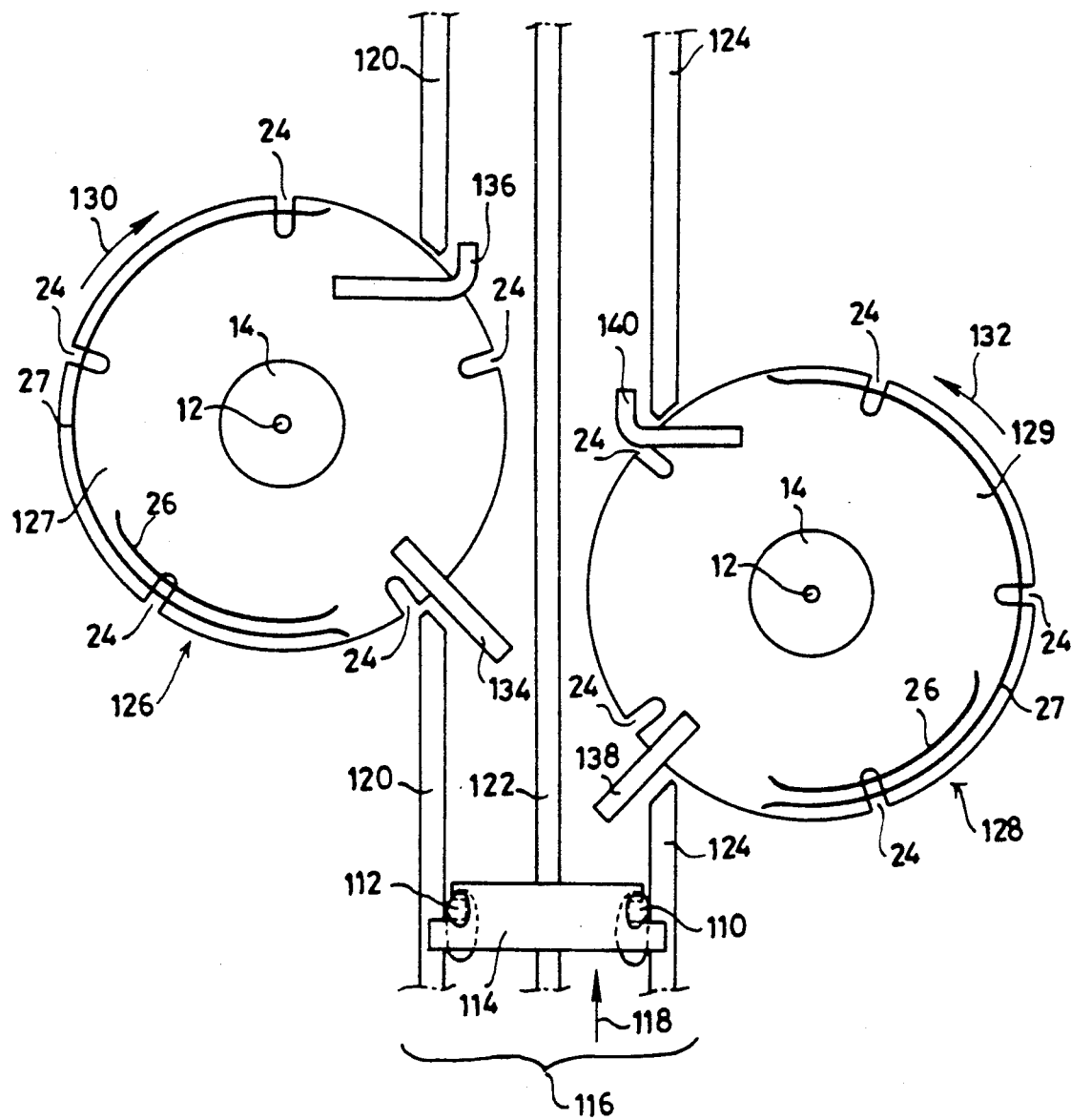
FIG. 13 shows a top view of two devices according to FIG. 1b which are included in a conveyor line.

FIG. 13 shows a part of a conveyor line in which a left leg 110 and a right leg 112, each of which is hung up by its tarsal joint, are moved along by means of a double hook 114 in a conveyor 116 in the direction of arrow 118. A pair of legs 110, 112 hanging in such a way is obtained, for example, by separating the body from the legs of a bird hanging by the tarsal joints and being moved with the breast in the direction of arrow 118 in the conveyor 116. The conveyor 116, in which many hooks are moved along, most of which for the sake of clarity are not shown, comprises three tracks 120, 122 and 124 over which the hook 114 moves, track 122 comprising a drive for the hook 114 and being uninterrupted. The track 120 along which the right leg 112 moves and the track 124 along which the left leg 110 moves, are both interrupted, in which interruptions the same scraper units 126 and 128, respectively, as those shown in FIG. 1b are placed.

The suspension discs 127 and 129 of the scraper units 126 and 128 respectively rotate in opposite directions to each other, indicated by arrows 130 and 132 respectively.

Guides 134 and 136 are fitted above the track and the suspension disc 127, near the interruption in the track 120; guides 138 and 140 are fitted in the same way above the track and the suspension disc 129, near the interruption in the track 124. The movements of the hook 114 and the suspension discs 127 and 129 are synchronized in such a way that on passing of the hook 114 guide 138 guides the left leg 110 from the hook into a slit of the suspension disc 129. In a corresponding way, guide 134 on passing of the hook 114 guides the right leg 112 from the hook into a slit of the suspension disc 127.

After the scraping operation in the scraper units 128 and 126, the left leg 110 and right leg 112 are conveyed back by means of guides 140 and 136 respectively on the tracks 124 and 120 respectively into the recesses of a hook 114. As in the case of FIG. 1b, it should also be pointed out in the case of FIG. 13 that after the scraping operation thigh meat with tendons can remain hanging on the hip joint part of the thigh-bone. The thigh meat must then be cut away from the thigh-bone using cutting means which are not shown. This can take place in the scraper units 126 and 128 or after rehanging of the legs in the conveyor 116. The legs which have had the thigh meat removed from them continue on their way in the conveyor 116, following which the thigh-bone is separated preferably automatically from the drumstick in a known manner. The thigh meat coming from the scraper units 126 and 128 is collected and discharged mechanically.

Next, a rotary device for cutting off drumsticks of bird legs employing the same inventive knee joint positioning principle as the above device will be described with reference to FIGS. 14–19.

Figure 14:
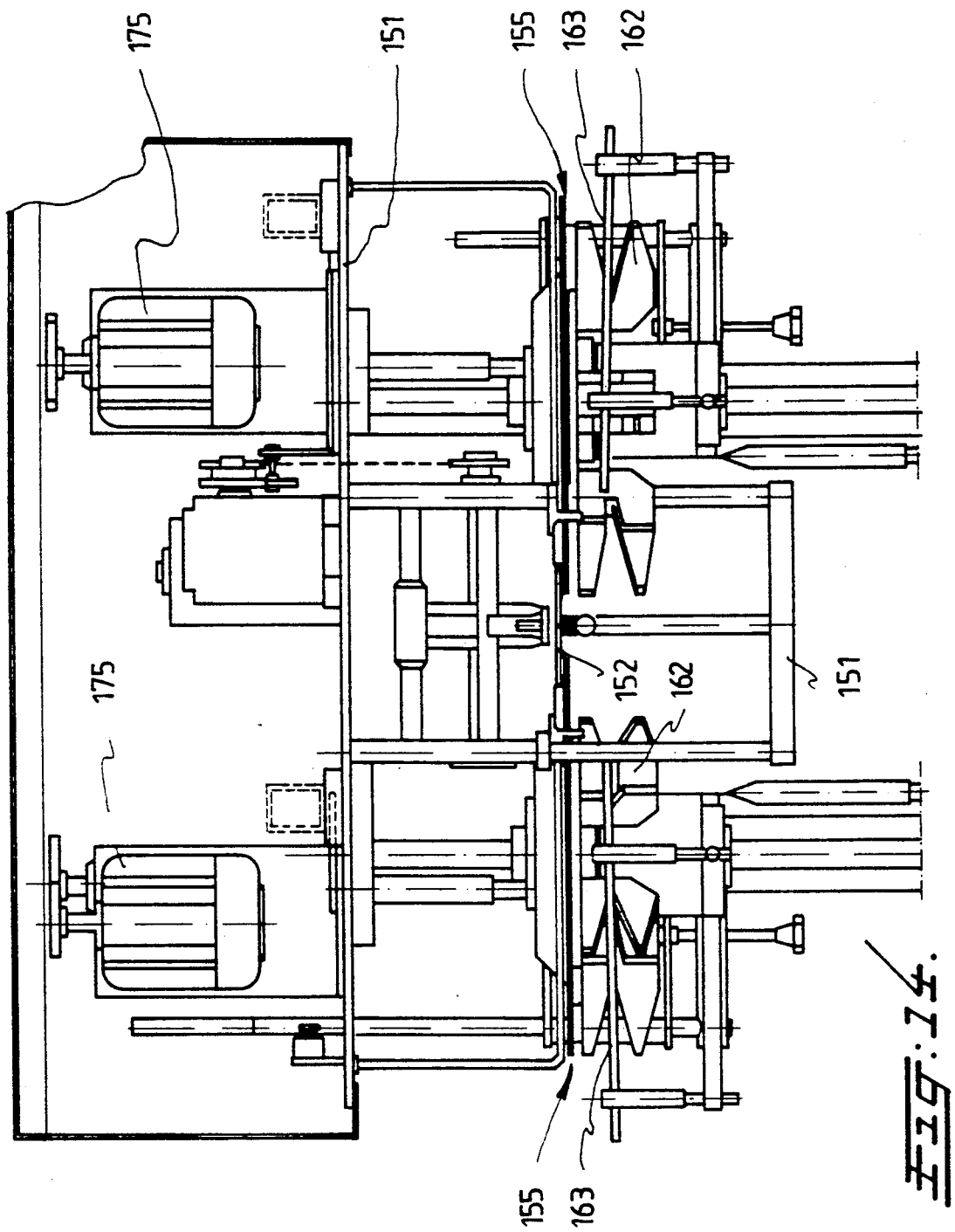
FIG. 14 shows a view of a large part of a rotary device for cutting off drumsticks of bird legs, viewed in the direction of forward movement of a conveyor present therein for conveying the legs hanging by the tarsal joint.
Figure 15:
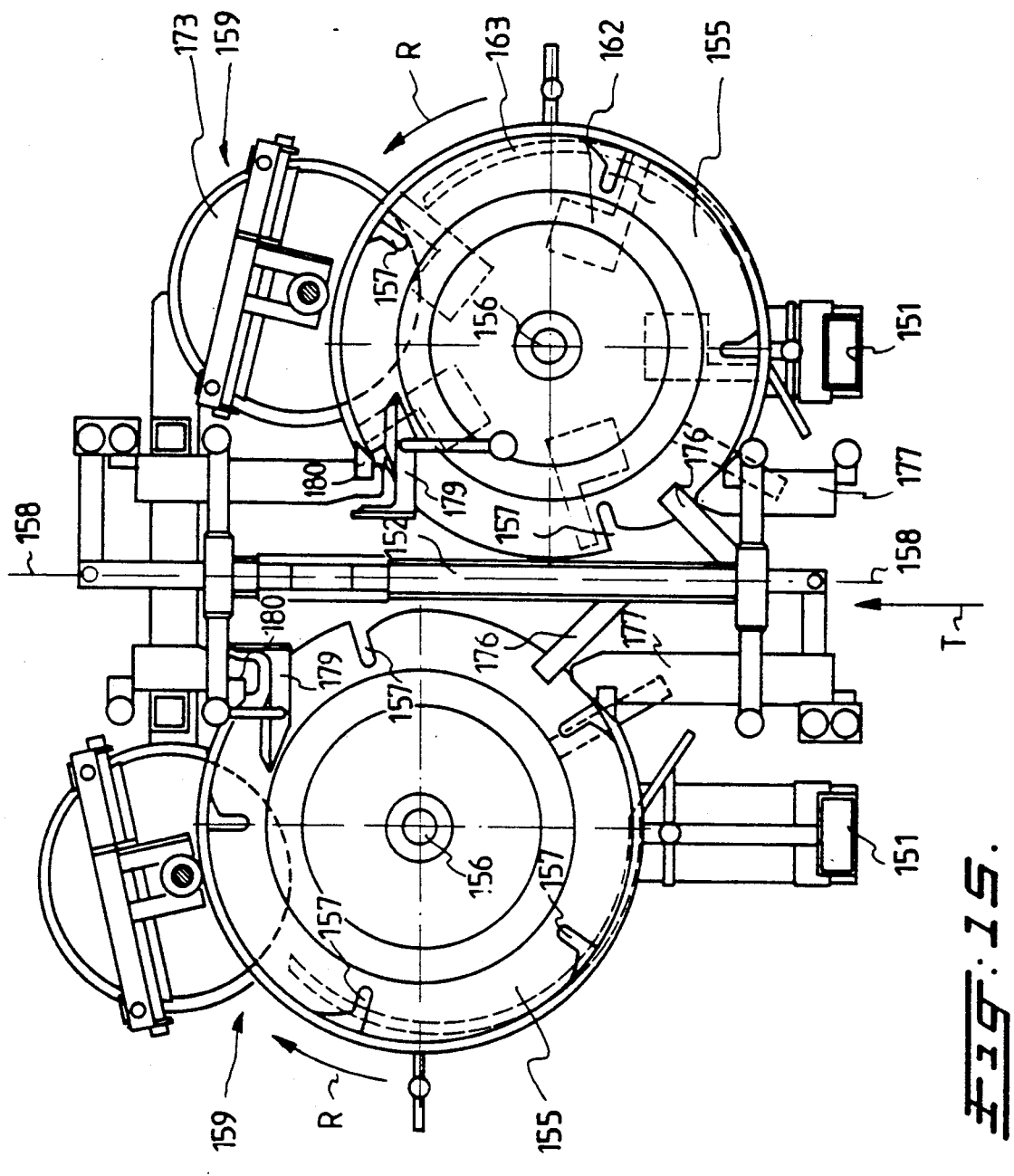
FIG. 15 is a top view of FIG. 14 after the top drive part has been removed from it.

As can best be seen in FIGS. 14 and 15, the device for cutting off drumsticks comprises a frame 151, containing a conveyor 152, in this case an overhead runway, by means of which the legs 154 hanging by the tarsal joint 153 are brought in. The device is also provided with two movable elements 155 each disposed on either side of the conveyor 152. As can be seen best in FIG. 15, each movable element 155 is rotatably mounted on a shaft 156. Each element 155 is also provided with a number of (in this case five) radially directed fork-shaped carriers 157 which during operation run in a circular path virtually tangentially along the centre line 158 of the conveyor 152. The forward movement of the conveyor is shown by an arrow T in FIG. 15, each element 155 with the carriers 157 moving in a direction R which is opposite to the direction of the conveyor 152. As will be explained below, the purpose of each rotary element 155 is to take over one by one the legs 154 from the conveyor 152, to retain them and to return them, which have been cut through in the meantime.

The device is also provided with a cutting element 159 interacting with each element 155 for cutting through the capsule, the ligaments and the tendons of the knee joint 160, and thus releasing the thigh 161 from the leg 154. Situated directly below each carrier 157 is a V-shaped supporting element 162 which moves along with the rotary element 155 and is also directed radially outwards, as can be seen in FIG. 14. A push rod 163 is fixed along a part of the circular path of the supporting elements 162. This part of the circular path is away from the conveyor 152, i.e. is situated diametrically relative to the part running along the centre line 158 of the conveyor 152. As is explained in greater detail and can be seen in FIGS. 14–16, the purpose of each push rod 163 is to gradually exert pressure in the radial inward direction against the back of the knee of a leg 154 present in a carrier 157.

In FIGS. 16–19 it can be seen that a displaceable lifter 164 is fitted at each of the V-shaped supporting elements 162 for pressing upwards—i.e. in the direction of the tarsal joint 153—the kneecap 165 of a leg joint 160 pressed by the rod 163 against the supporting element (see the situation indicated by a dashed and dotted line in FIG. 16).

The supporting element 162 is made up of two scissor-shaped open limbs 166, 167. The upper limb 166 is provided with a thickened part 168 against which the leg 154 rests during bending of the knee joint 160. The lower limb 167 bears the displaceable lifter 164. A curved track 169 (see FIG. 18) is disposed concentrically with the shaft 156 of each rotary element 155. Each lifter 164 is rotatably fitted on the lower limb 167 of the supporting element 162 and is also provided with a radially inward-directed follow-on roller 170 which can interact with the curved track 169. One of the two limbs 166, 167 of the supporting element 162 is rotatable relative to the other limb. In the case shown here the lower limb 167 is rotatable relative to the fixed upper limb 166. Like the lifter 164, this lower limb is provided with a radially inward directed follow-on roller 171. This roller can interact with a second concentrically disposed curved track 172 for temporarily snapping the supporting element 162 to a closed position.

The above-mentioned cutting element 159 is formed by a disc 173 which is rotatable about a shaft 174 supported in the frame 151. The angular position of this shaft 174 is adjustable for altering or adjusting the position of the disc 173 relative to the supporting element 162. This is connected with the basic idea of the present proposal: cutting through the knee joint 160 at a predetermined place. It can be seen from FIG. 15 that one of the two rotary elements 155 disposed at either side of the conveyor 152 is staggered relative to the other. FIG. 14 shows that each element 155 is provided with its own drive motor 175, the speed of rotation of which is synchronized with the forward movement speed of the conveyor 152, since each of the five carriers 157 must be able to interact with following bearing elements (not shown) of this conveyor.

The device described above operates as follows. The conveyor 152 feeds in a regular stream of legs 154, both right and left of the centre line 158. This stream moves in the direction of the arrow T. On reaching the rotary elements 155, each leg is removed from the conveyor 152 by means of guide elements 176, 177 and fed into a fork-shaped carrier 157 of the element 155 present on the spot at that moment. Said rotary element turns in a direction R opposite to the direction T of the conveyor 152 and carries the suspended leg 154 past the fixed push rod 163 situated some distance below the element 155, at the level of the V-shaped supporting element 162. The position of the push rod 163 can be seen clearly in FIGS. 14 and 15. This push rod is used to exert a gradually increasing pressure in the radially inward direction against the back of the knee of the leg present in the carrier 157. During rotation of the element 155 the situation shown in FIG. 16 is gradually produced.

Towards the time when the end of the push rod 163 is being reached the curved track 169 goes into operation, in which case the follow-on roller 170 of the lifter 164 is forced downwards. The point of the lifter 164 in this case lifts the kneecap 165 from the joint 160 and at the same time fixes the leg 154 in the supporting element 162. This fixing is further aided by the presence of a recess 178 next to the upper limb 166 of the supporting element 162. In this state the fork-shaped carrier 157 with the leg 154 passes the cutting element 159, i.e. the disc 173. The knee joint 160 is cut through in this way. The thigh 161 falls down, and only the lower leg or drumstick remains behind with its tarsal joint 153 in the fork-shaped carrier 157 of the rotary element 155. The drumstick is fed back to the conveyor 152 by means of a second set of guide elements 179, 180. The lifter 164 also returns to its normal position.

It is pointed out that by means of the second curved track 172 and the follow-on roller 171 the lower limb 167 of the V-shaped supporting element 162 can be turned upwards for the temporary closure of the V-shaped access opening during passage through the part of the circular path along the centre line 158 of the conveyor 152 in the vicinity of the guide element 176. In this way it can be ensured that a part of the leg 154 to be transferred from the conveyor 152 to the carrier 157 does not go into the V-shaped access opening, as a result of which the leg could not be positioned properly.

Next, a linear device for cutting off drumsticks of bird legs employing the same inventive knee joint positioning principle as the above devices will be described with reference to FIGS. 20a–23c.

Figure 20A:
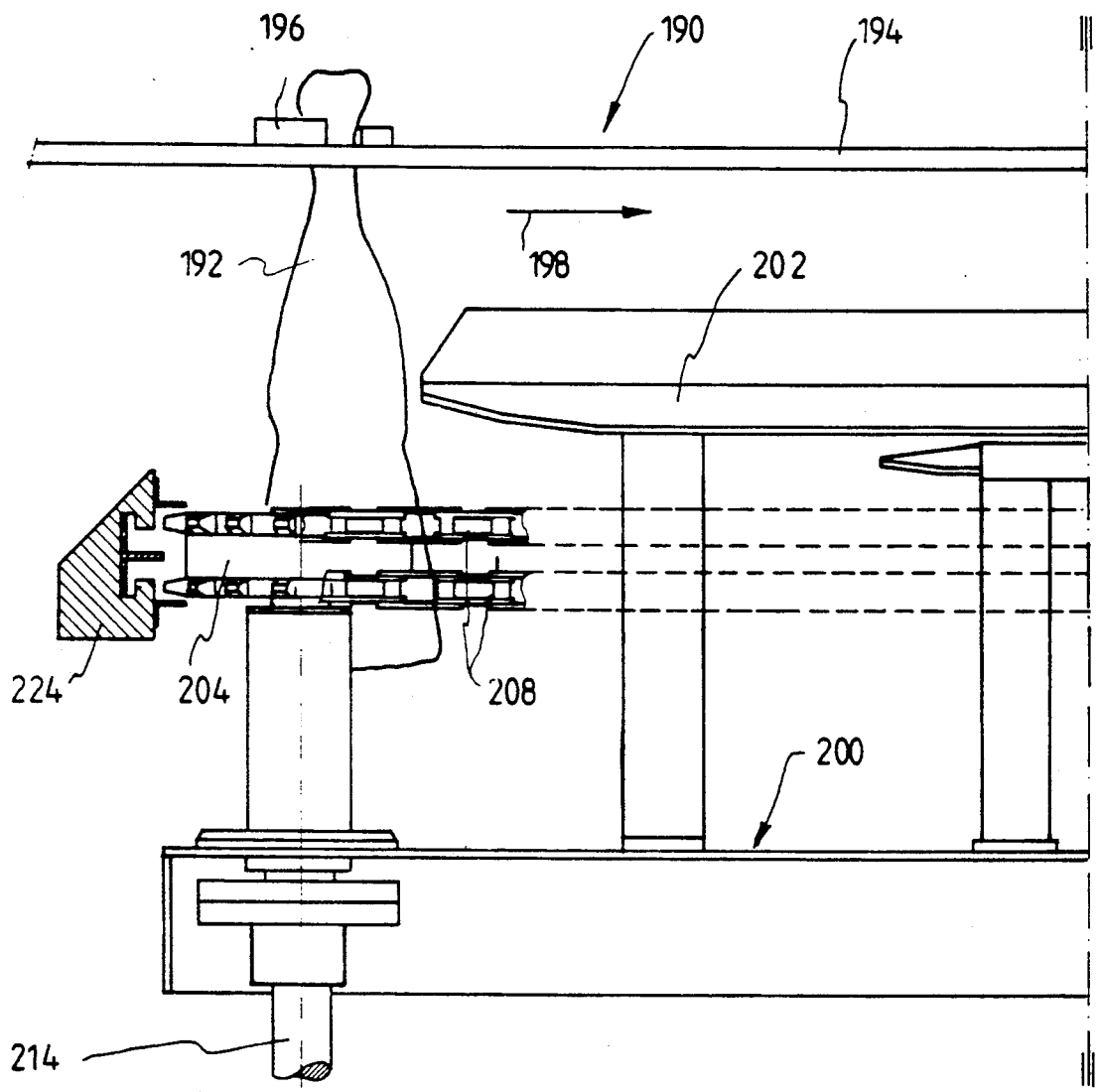
FIG. 20a and 20b show complementary parts of a side view, partially in cross-section, of a linear device for cutting off drumsticks of bird legs, situated under a conveyor for conveying the legs hanging by the tarsal joint.
Figure 20B:
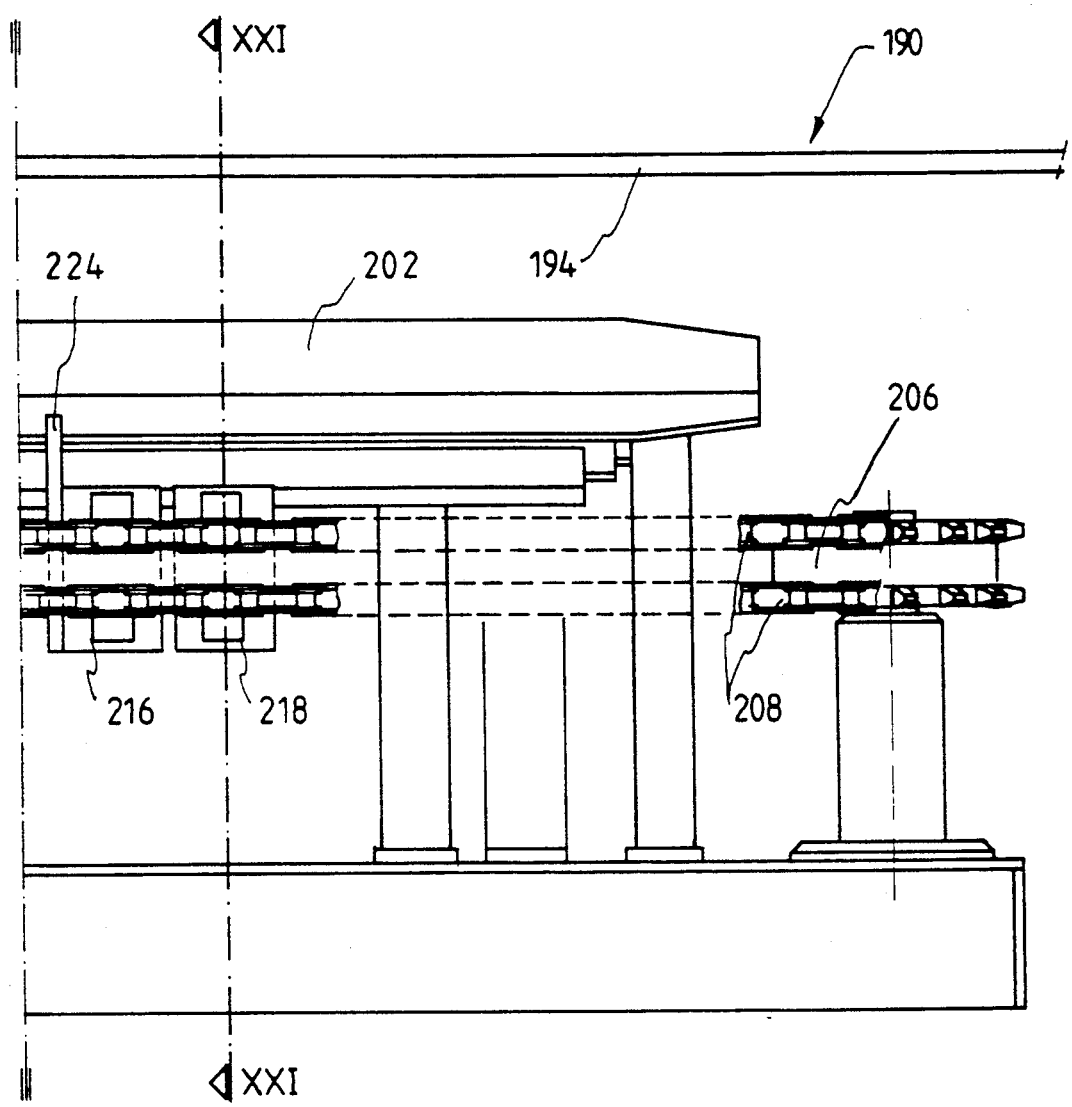
Figure 21:
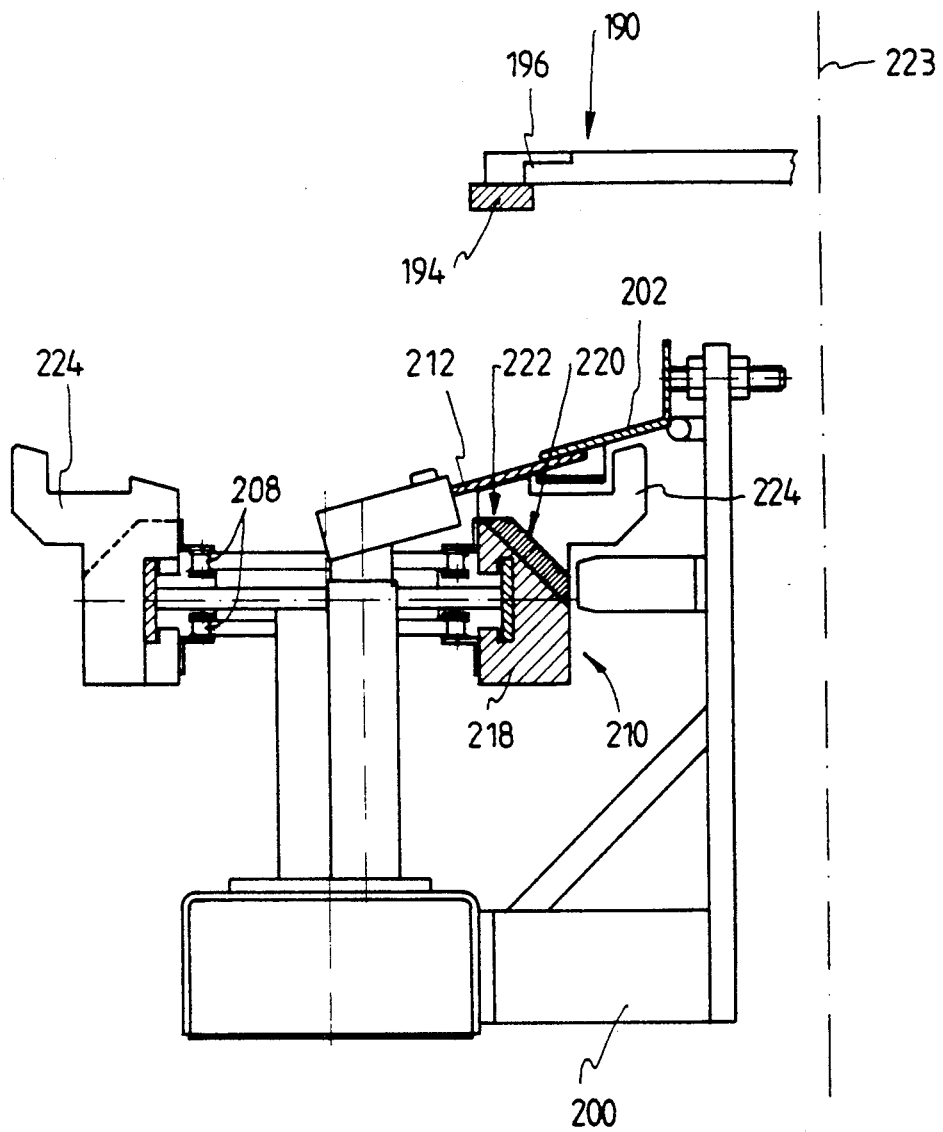
FIG. 21 is a cross-section of the device of FIGS. 20a and 20b along line XXI—XXI.

FIGS. 20a, 20b and 21 show a conveyor 190 by means of which bird legs 192 suspended by their tarsal joint can be conveyed at regularly spaced intervals along a guide rail 194 with transport elements 196 movable in the direction indicated with an arrow 198.

Under the conveyor 190 in the path of the legs 192 a device according to the invention for cutting off drumsticks is disposed, the device in the shown embodiment comprising a elongated frame 200 composed mainly of beams and strips for supporting the remaining components of the device, a guide strip 202, two double gear wheels 204, 206 rotatably mounted in the frame 200 at different ends, an endless double chain 208 coupling the gear wheels 204, 206, leg positioning means 210 fitted to the double chain 208 at distances corresponding to the distances between transport elements 196 and movable therewith, and separating means 212 interacting with the guide strip 202 for separating the drumstick from the thigh of the leg 192. The gear wheel 204 can be driven by means of a shaft 214 in such a way that the double chain 208 moves in perfect synchronism with the transport elements 196, e.g. by coupling the shaft 214 through a suitable transmission (not shown) to the drive (not shown) of the transport elements 196.

The leg positioning means 210 comprise two positioning blocks 216, 218 with a first stop surface 220 inclined at approximately 45° to a second horizontal stop surface 222, as can best be seen in FIG. 21. The first positioning block 216 comprises an outward projecting aligning plate 224 at right angles with the stop surfaces 220, 222.

It is to be understood here that the device shown in FIG. 20a, 20b and 21 is designed for processing only one kind of bird legs, e.g. right legs. Should both right legs and left legs be processed simultaneously, then the device can be doubled having mirror symmetry with reference to a plane indicated by line 223.

Figure 22:
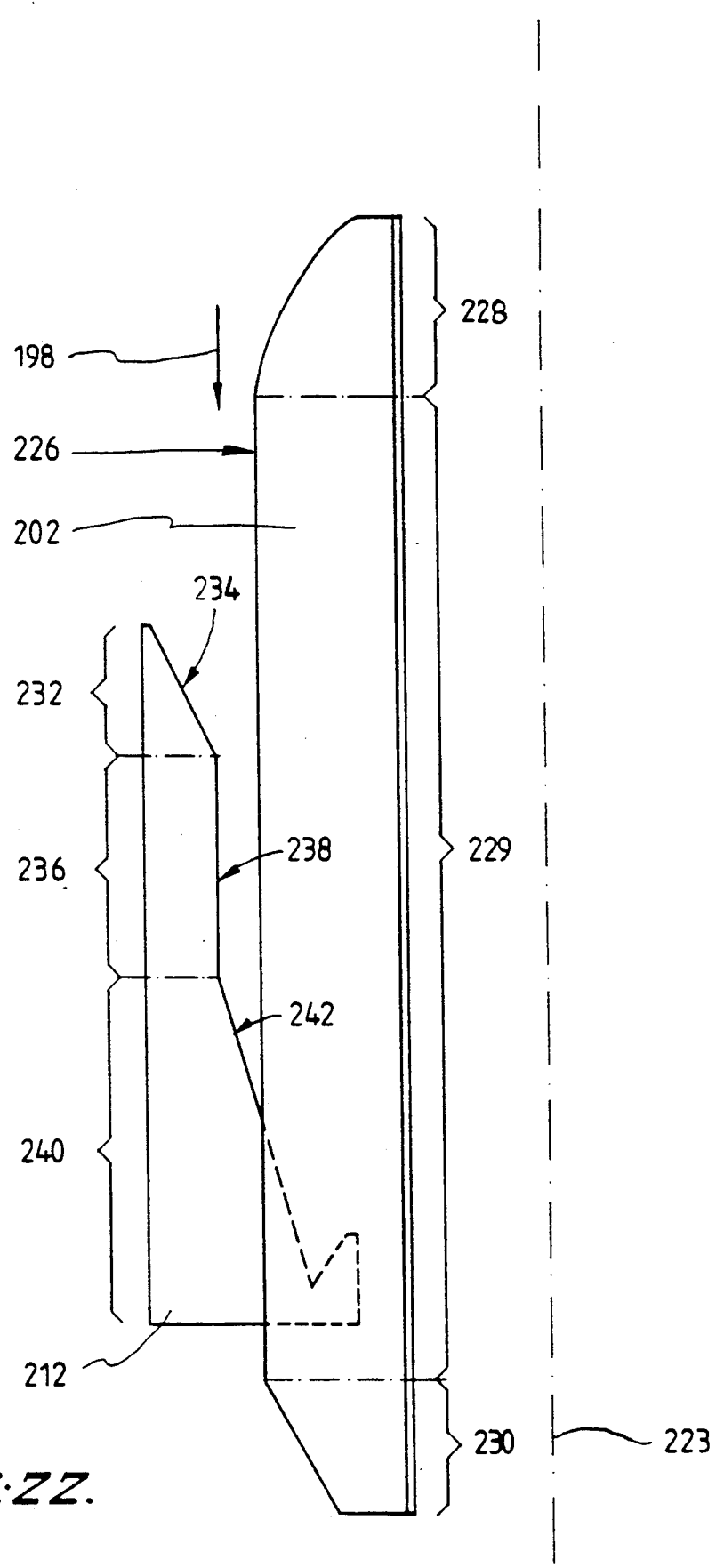
FIG. 22 is a schematically illustrated top view of the device of FIGS. 20a and 20b on a smaller scale, the conveyor being omitted for the sake of clarity.

The shape and construction of the interacting guide strip 202 and the separating means 212, which, for the processing of the leg passing between them interact with the positioning means, are explained with reference to FIG. 22, from which all non-relevant details have been left out. For orientation purposes, the arrow 198 has been added to the figure.

Guide strip 202 has a gradually sideways widening run-in part 228 with a blunt guide edge 226, a gradually sideways narrowing run-out part 230, and an intermediate part 229 in which the blunt guide edge 226 is straight and runs parallel to the guide rail 194 (not shown here).

The plate-shaped separating means 212 comprise a run-in part 232 with a cutting edge 234, a joint-separating part 236 with a blunt edge 238 and a drumstick cutting part 240 with a cutting edge 242, folded back at the end.

The guide edge 226 at the intermediate part 229 of the guide strip 202 and the cutting edge 234 of the separating means 212 define a narrowing gap, as seen in the direction of arrow 198. The blunt guide edge 226 at the intermediate part 229 and the blunt edge 238 principally run parallel to each other. The straight blunt edge 226 at the intermediate part 229 and the straight cutting edge 242, as seen in the direction of arrow 198, converge and intersect, while after the intersection point the separating means extends under the guide strip 202.

The operation of the linear drumstick cutting device is as follows. A leg 192 of a bird suspended by its tarsal joint is brought in by the transport element 196 moving along guide rail 194. At the same time, leg positioning means 210 move beside (positioning blocks 216, 218) and behind (aligning plate 224) the leg, which is thereby rotated around its longitudinal axis until the kneecap of the knee joint is situated transversely to the direction of conveyance 198, pointing sideways in the direction of the separating means 212.

Figure 23C:
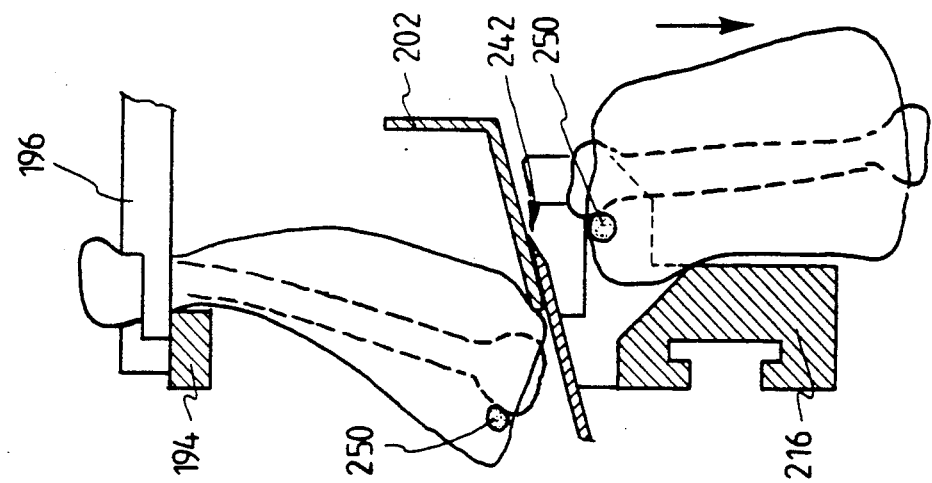
FIGS. 23a–23c illustrate various stages of the drumstick cutting operation performed by the device according to FIGS. 20a, 20b, 21 and 22.
Figure 23B:
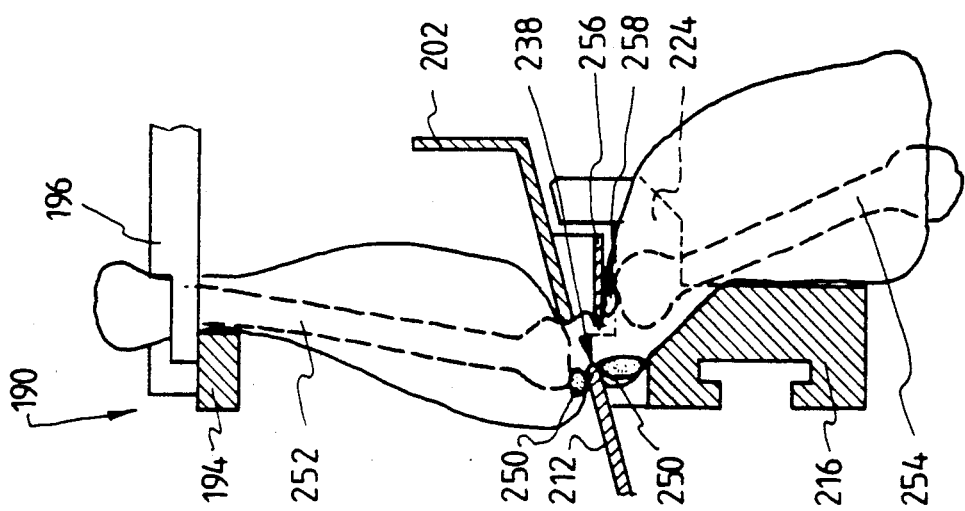
Figure 23A:
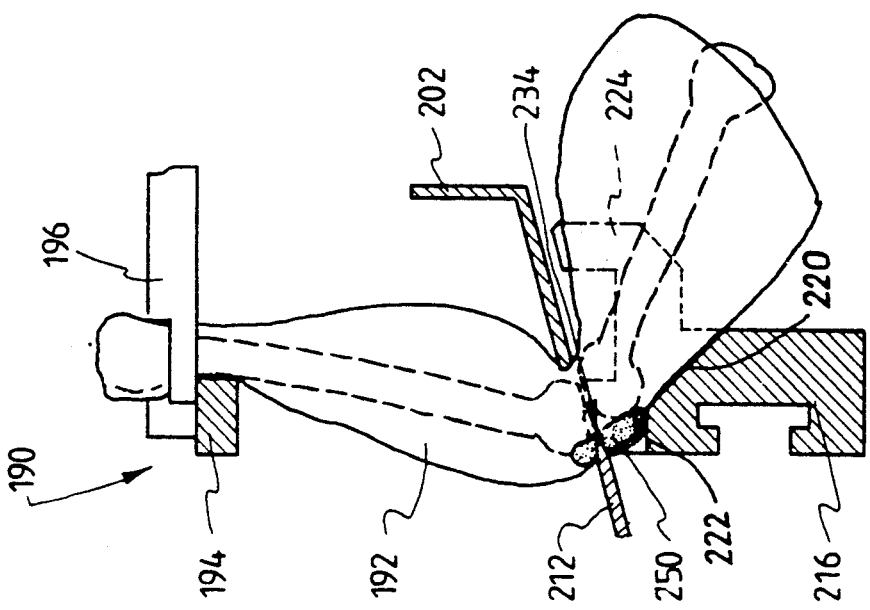

As illustrated in FIG. 23a, during movement of the leg 192 along the guide edge 226 of the run-in part 228 of the guide strip 202 the leg 192 is pushed out sideways in the back of the knee by the guide strip 202, after which, when entering the region of the run-in part 232 of the separating means 212 the cutting edge 234 cuts through the skin and the kneecap 250. This is possible while the kneecap 250 is situated accurately in a predetermined position on the horizontal stop surface 222 of the positioning block 216, pushed over the edge between the first stop surface 220 and the second stop surface 222 by the force exerted by the blunt guide edge 226 of the guide strip 202 on the back of the knee.

Next, as illustrated in FIG. 23b, during further movement of the leg 192 in the direction of conveyance 198, the blunt edge 238 of the separating means 212 is driven between the ends of the drumstick bone 252 and the thigh-bone 254, thus separating the knee joint without damaging the bone ends. The knee joint is further separated by the presence of a push element 256 exerting a downward force on the thigh bone 254. This in particular prevents a cartilage nodule 258 on the end of the thigh bone 254 from being damaged.

Finally, FIG. 23c illustrates the cutting off of a drumstick by moving the leg 192 further along the guide edge 226 of the guide strip 202 past the intersection point of the guide edge 226 and the cutting edge 242 of the separating means 212. The folded back end of the cutting edge 242 ensures that the thigh is completely separated from the lower leg, since any remaining connections between the two leg parts by the skin or the like are trapped and cut in the converging V-shaped region.

After the drumstick cutting operation, the drumstick is conveyed further by means of the transport elements 196 of the conveyor 190 to a place where they are collected and packed. The thighs separated from the drumsticks are also collected and may be processed further by conventional deboning means.

In the above the invention has been illustrated with the description of devices for processing of bird legs, but it is well understood that the invention is by no means limited to this use and can be readily adapted to the processing of legs of other slaughter animals, e.g. hind legs of pigs.

What is claimed is:

1. A method for positioning a knee joint of a leg of a slaughtered animal, the knee joint including a kneecap, in particular a bird, in preparation of a cutting operation performed by a cutting means, comprising the step of engaging the kneecap with kneecap positioning means to position the knee joint relative to the cutting means prior to the cutting operation.

2. A method according to claim 1, wherein prior to or during positioning of the kneecap relative to the cutting means, the leg is bent in the knee joint in its natural bending direction.

3. A method according to claim 2, wherein the leg is bent in such a way that the part of the leg situated at one side of the knee joint is approximately at right angles to the part of the leg situated at the other side of the knee joint.

4. A device for performing a cutting operation near the knee joint of a leg of a slaughtered animal, the knee joint including a kneecap, in particular a bird, comprising:

means for supporting the leg;
   cutting means for performing the cutting operation; and mechanical positioning means which operate on the kneecap for positioning the knee joint relative to the cutting means.

5. A device according to claim 4, further comprising bending means for bending the leg in the knee joint in its natural bending direction.

6. A device according to claim 5, wherein the bending means are designed for bending the leg in such a way that the part of the leg situated at one side of the knee joint is approximately at right angles to the part of the leg situated att the other side of the knee joint.

7. A device according to claim 4, wherein the positioning means comprise one or more supporting elements with a stop edge, which can assume different positions relative to the mechanical means for handling the leg, in order to be able to move the stop edge along the thigh of the leg to against the kneecap.

8. A device according to claim 4 further comprising scraper means for scraping the thigh meat off the thighbone from the knee joint to the hip joint and a suspension element for suspending a leg to be processed by the ankle joint.

9. A device according to claim 8, wherein the cutting means is adapted to make an incision in the meat at one or more sides of the knee joint, essentially at right angles to the lengthwise direction of the leg, which incision forms the starting point for the scraping operation.

10. A device according to claim 8, wherein the scraper means comprise first and second plate-shaped, curved scraper elements which each are movable along a circular arc, which scraper elements are adapted to slide over one another and to be moved at right angles to the plate surface, and are each provided at the edge facing each other with a recess which is open at one side, which two recesses determine a scraper opening with at least approximately the cross-section of a thighbone when the scraper elements are partially slid over each other.

11. A device according to claim 10, wherein the edge boundary of the recess of the first scraper element in the region determining the scraper opening is designed with an essentially partially circular recessed part.

12. A device according to claim 10, wherein the second scraper element comprises a fixed insert of a resilient material which determines the recess of said scraper element.

13. A device according to claim 10, wherein during the scraping operation the suspension element encloses the leg on all sides with play near the ankle joint at the side of the knee joint, the opening of the enclosure being smaller than the cross-section of the ankle joint.

14. A device according to claim 10, wherein the cutting means are formed by a combination of:
   the first scraper element, of which the edge boundary of the foot of the recess is sharp, in order to permit cutting under pressure of the second scraper element at the sides and the rear side of the knee joint; and
   two knives which move along the knee joint at right angles to the lengthwise direction of the leg, and can cut at the front and rear sides respectively of the knee joint.

15. A device according to claim 10, wherein the positioning means are formed by a combination of:
   the second scraper element which is provided, in the region determining the scraper opening, with a stop which is intended for pressing the kneecap upwards against the edge thereof; and
   control means for controlling the movements of the bending and the scraper means.

16. A device according to claim 10, wherein the bending means are formed by a combination of:
   the suspension element for hanging the leg by the ankle joint;
   the first scraper element; and
   a stop for holding the thigh at the front side of the leg at the hip joint.

17. A device according to claim 10, wherein the bending means are formed by a combination of:
   the suspension element for hanging the leg by the ankle joint;
   a bracket, one end of which can be moved in the back of the knee of the leg; and
   a stop for holding the thigh at the front side of the leg at the hip joint.

18. A device according to claim 16 or 17, wherein the stop comprises an aligning plate to prevent the rotation of the leg about its axis.

19. A device according to claim 10, comprising a combination of different scraper units which are movable about central control means.

20. A device according to claim 19, wherein the control means comprise an essentially cylindrical central control element provided with guide grooves on the cylindrical surface, in the guide grooves of which control elements of the scraper units can move, for controlling the component parts of the scraper units.

21. A device according to claim 19 or 20, wherein the combination of scraper units is accommodated in a conveyor line in which legs hanging from hooks are conveyed, and from which conveyor line the legs are transferred to the suspension elements prior to the scraping operation, and in which the legs are suspended again after the scraping operation.

22. A device according to claim 4 wherein the means for supporting the leg comprises a frame with a conveyor for bringing in the legs hanging by the ankle joint, wherein:
   at least one rotary element is disposed next to the conveyor for taking over the legs one by one from the conveyor and retaining them, and returning the lower legs thereof, which rotary element is provided with a number of carriers which during operation move in a circular path virtually tangentially along the center line of the conveyor, in a direction opposite to the forward movement of the conveyor, past a cutting element interacting with each rotary element;
   a V-shaped supporting element, which projects radially outwards and moves along with the rotary element, is present below each carrier;
   a push rod is disposed along a part of the circular path of the supporting elements away from the conveyor, for gradually exerting pressure in the radially inward direction against the back of the knee of a leg present in a carrier; and
   a displaceable lifter is fitted at each of the V-shaped supporting elements for positioning, in the direction of the ankle joint, the kneecap of a knee joint pressed by the push rod against the supporting element in question.

23. A device according to claim 22, wherein the supporting element is made up of two scissor-shaped, open upper and lower limbs, the upper limb being provided with a thickened part against which the leg rests during bending of the knee joint, and the lower limb bearing the displaceable lifter.

24. A device according to claim 23, wherein a curved track is disposed concentrically with the shaft of each rotary element, and in that each lifter is rotatably fitted on the lower limb of the supporting element and is also provided with a radially inward-directed follow-on roller which can interact with said curved track.

25. A device according to claim 24, wherein one of the two limbs of the supporting element is rotatable relative to the other limb and is also provided with a radially inward directed follow-on roller which can interact with a second concentrically disposed curved track for temporarily closing the supporting element.

26. A device according to claim 22, in which the cutting element is formed by a disc which is rotatable about a shaft supported in the frame, wherein the angular position of the shaft is adjustable, for adapting the position of the disc relative to the supporting element.

27. A device according to claim 22, wherein a rotary element is disposed on either side of the conveyor, and in that each element is provided with its own drive motor, the speed of rotation of which is synchronized with the forward movement speed of the conveyor.

28. A device according to claim 4 wherein the means for supporting the legs comprises a frame with a conveyor for bringing in the legs hanging by the ankle joint, the device further comprising:

guide means with a guide edge running mainly parallel with a conveyance direction of the conveyor for pushing the leg out sideways;

leg positioning means which are situated beside the legs suspended from the conveyor and, in operation, cooperate with the guide means to position the kneecap of a knee joint against a supporting element;

separating means cooperating with the guide means and the leg positioning means for separating the lower leg from the thigh; and wherein the leg positioning means comprise one or more supports with a first inclined stop surface adjacent to a second horizontal stop surface, an intersecting curve of the two stop surfaces defining a stop edge for positioning the kneecap of the knee joint relative to the separating means.

29. A device according to claim 28, wherein the separating means comprise a run-in part with a cutting edge leading towards the guide edge of the guide means, a joint-separating part with a butted edge running parallel with the guide edge of the guide means, and a drumstick cutting part with a cutting edge, leading towards and under the guide edge of the guide means.

30. A device according to claim 29, wherein the end of the cutting edge of the drumstick cutting part of the separating means is folded back for completely separating the thigh from the lower leg.

* * * * *